United States Patent
Lv et al.

(10) Patent No.: US 12,149,603 B2
(45) Date of Patent: Nov. 19, 2024

(54) CLOCK PORT ATTRIBUTE RECOVERY METHOD, DEVICE, AND SYSTEM

(71) Applicant: Huawei Technologies Co., Ltd., Shenzhen (CN)

(72) Inventors: Jingfei Lv, Wuhan (CN); Yawei Zhang, Beijing (CN); Jinhui Wang, Dongguan (CN); Hao Li, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/857,412

(22) Filed: Jul. 5, 2022

(65) Prior Publication Data

US 2022/0337384 A1   Oct. 20, 2022

Related U.S. Application Data

(63) Continuation of application No. PCT/CN2021/070507, filed on Jan. 6, 2021.

(30) Foreign Application Priority Data

Jan. 6, 2020 (CN) .......................... 202010011547.7
Mar. 2, 2020 (CN) .......................... 202010136536.1

(51) Int. Cl.
  *H04L 7/00* (2006.01)
  *H04J 3/06* (2006.01)

(52) U.S. Cl.
  CPC .......... *H04L 7/0008* (2013.01); *H04J 3/0638* (2013.01)

(58) Field of Classification Search
  CPC ............................ H04L 7/0008; H04J 3/0638
  See application file for complete search history.

(56) References Cited

U.S. PATENT DOCUMENTS

2012/0188997 A1* 7/2012 Zakrzewski ............ H04W 4/70
                                                           370/350
2013/0077659 A1* 3/2013 Okuda .................. H04J 3/0667
                                                           375/219

(Continued)

FOREIGN PATENT DOCUMENTS

CN       101394264 A      3/2009
CN       103051406 A      4/2013

(Continued)

OTHER PUBLICATIONS

Geoffrey M. Garner, "IEEE 1588 Version 2," Sep. 24, 2008, 89 pages.

(Continued)

*Primary Examiner* — Bailor C Hsu
(74) *Attorney, Agent, or Firm* — HUAWEI TECHNOLOGIES CO., LTD.

(57) ABSTRACT

A clock port attribute recovery method includes a network device setting a value of a port attribute of a clock port of the network device to a first value based on the clock port not receiving any one of three types of clock messages: N synchronization messages, follow-up messages, and delay response messages within a timeout interval, where the first value indicates that a message is lost on the clock port. Based on a case that a recovery condition is met, the network device sets the value of the port attribute of the clock port to a second value, where the second value indicates that a status of the clock port is that the message is not lost.

28 Claims, 10 Drawing Sheets

(56) References Cited

U.S. PATENT DOCUMENTS

| | | | | |
|---|---|---|---|---|
| 2013/0227172 A1* | 8/2013 | Zheng | ............... | H04J 3/0667 709/248 |
| 2017/0250791 A1* | 8/2017 | Han | ............... | H04J 3/14 |
| 2020/0021378 A1* | 1/2020 | Aweya | ............... | H04J 3/0673 |
| 2022/0224501 A1* | 7/2022 | Lesi | ............... | H04J 3/14 |
| 2023/0198738 A1* | 6/2023 | Avikkal | ............... | H04J 3/0667 370/503 |

FOREIGN PATENT DOCUMENTS

| | | |
|---|---|---|
| EP | 2770678 A1 | 8/2014 |
| WO | 2017130034 A1 | 8/2017 |

OTHER PUBLICATIONS

"IEEE Standard for a Precision Clock Synchronization Protocol for Networked Measurement and Control Systems, IEEE Instrumentation and Measurement Society," IEEE Std 1588, Jul. 24, 2008, 289 pages.

"IEEE Standard Profile for Use of IEEE 1588 Precision Time Protocol in Power System Applications," IEEE Std C37.238, Mar. 23, 2017, 42 pages.

SMPTE ST 2059-1:2015, "SMPTE Standard, Generation and Alignment of Interface Signals to the SMPTE Epoch," Mar. 26, 2015, 31 pages.

SMPTE ST 2059-2:2015, "SMPTE Standard, SMPTE Profile for Use of IEEE-1588 Precision Time Protocol in Professional Broadcast Applications," Mar. 26, 2015, 19 pages.

ITU-TG.8275.1/Y.1369.1, Jul. 2014, "Series G: Transmission Systems and Media, Digital Systems and Networks, Packet over Transport aspects—Synchronization, quality and availability targets, Series Y: Global Information Infrastructure, Internet Protocol Aspects and Next-Generation Networks Internet protocol aspects—Transport, Precision time protocol telecom profile for phase/time synchronization with full timing support from the network," 42 pages.

ITU-TG.8275.1/Y.1369.1, Amendment 3, Aug. 2019, "Series G: Transmission Systems and Media, Digital Systems and Networks Packet over Transport aspects—Synchronization, quality and availability targets Series Y: Global Information Infrastructure, Internet Protocol Aspects, Next-Generation Networks, Internet of Things and Smart Cities Internet protocol aspects—Transport, Precision time protocol telecom profile for phase/time synchronization with full timing support from the network, Amendment 3," 64 pages.

ITU-T G.8275.1/Y.1369.1, Mar. 2020, "Series G: Transmission Systems and Media Digital Systems and Networks, Packet over Transport aspects—Synchronization, quality and availability targets, Series Y: Global Information Infrastructure, Internet Protocol Aspects, Next-Generation Networks, Internet of Things and Smart Cities, Internet protocol aspects—Transport, Precision time protocol telecom profile for phase/time synchronization with full timing support from the network," 62 pages.

ITU-T G.8275.2/Y.1369.2, Jun. 2015, "Series G: Transmission Systems and Media Digital Systems and Networks, Packet over Transport aspects—Synchronization, quality and availability targets, Series Y: Global Information Infrastructure, Internet Protocol Aspects, Next-Generation Networks, Internet of Things and Smart Cities, Precision time protocol telecom profile for phase/time synchronization with partial timing support from the network," 46 pages.

ITU-T G.8275.2/Y.1369.2 Amendment 3, Aug. 2019, Series G: Transmission Systems and Media, Digital Systems and Networks Packet over Transport aspects, Synchronization, quality and availability targets, Series Y: Global Information Infrastructure, Internet Protocol Aspects and Next-Generation Networks, Internet of Things and Smart Cities, Internet protocol aspects—Transport, Precision time protocol telecom profile for phase/time synchronization with partial timing support from the network, 68 pages.

ITU-T G.8275.2/Y.1369.2 Mar. 2020, "Series G: Transmission Systems and Media, Digital Systems and Networks Packet over Transport aspects, Synchronization, quality and availability targets, Series Y: Global Information Infrastructure, Internet Protocol Aspects and Next-Generation Networks, Internet of Things and Smart Cities, Internet protocol aspects—Transport, Precision time protocol telecom profile for phase/time synchronization with partial timing support from the network," 70 pages.

* cited by examiner

CLOCK PORT ATTRIBUTE RECOVERY METHOD, DEVICE, AND SYSTEM

CROSS-REFERENCE TO RELATED APPLICATIONS

This is a continuation of International Patent Application No. PCT/CN2021/070507 filed on Jan. 6, 2021, which claims priority to Chinese Patent Application No. 202010011547.7 filed on Jan. 6, 2020 and Chinese Patent Application No. 202010136536.1 filed on Mar. 2, 2020. All of the aforementioned patent applications are hereby incorporated by reference in their entireties.

TECHNICAL FIELD

This disclosure relates to the communication field, and a clock port attribute recovery method, a device, and a system.

BACKGROUND

When a distributed system is increasingly used in communication and network applications, clock synchronization becomes increasingly important. As a clock synchronization mode, a Network Time Protocol (NTP) is widely used. In addition, to meet increasing requirements for high-precision time synchronization, the Institute of Electrical and Electronics Engineers (IEEE) officially released the IEEE 1588v2 standard (IEEE Standard for a Precision Clock Synchronization Protocol for Networked Measurement and Control Systems) in 2008. The standard is a precision clock synchronization protocol standard for a network measurement and control system. To meet a time synchronization requirement of a wireless base station, a mobile bearer network may transfer precise time to each base station by using an IEEE 1588v2 protocol, to meet the time synchronization requirement of the base station.

A device in a network usually selects an optimal 1588 clock source by using a best master clock (BMC) algorithm for tracking. The device determines, by using a BMC source selection algorithm, that a status of a port on the device is a master clock port, a slave clock port, or a passive clock port. When determining a status of a clock port by using the BMC algorithm, the device calculates a port dataset of the clock port, and information of the port dataset of the clock port is related to an attribute of the clock port. Therefore, ensuring correctness of a clock port attribute on a network device is key to ensuring correctness of clock source tracking.

SUMMARY

Embodiments of this disclosure provide a clock port attribute recovery method, a device, and a system, to resolve a technical problem that a clock port status may be incorrect because a clock port attribute cannot be recovered. Technical solutions are as follows.

According to a first aspect, a clock port attribute recovery method is provided. The method may be performed by a first network device, and the method includes the following steps. The first network device sets a value of a port dataset signal fail attribute of a clock port to a first value based on a case that the clock port does not receive N clock messages of a first type within a timeout interval, where the clock port is connected to a master clock port of a second network device, the clock port is a slave port or a passive port, the clock message of the first type is any one of the following three types of clock messages: a synchronization message, a follow-up message, and a delay response message, N is a positive integer greater than 0, and the first value indicates that a message is lost on the clock port, and after setting the value of the port dataset signal fail attribute to the first value, the first network device sets the value of the port dataset signal fail attribute to a second value when the first network device determines that a recovery condition is met, to indicate that no message is lost on the clock port.

A method in which the network device recovers the value of the port dataset signal fail attribute of the clock port to the second value based on the recovery condition after setting the value to the first value based on message loss can help keep the value of the port dataset signal fail attribute correct, so that a status of the clock port can be kept normal, and correctness of a clock tracking relationship is ensured.

In a possible design, that the first network device determines that a recovery condition is met includes that the first network device receives a configuration instruction, where the configuration instruction is used to instruct the first network device to set the value of the port dataset signal fail attribute to the second value. After a network administrator determines that the clock port of the first network device has received a message sent by the connected master clock port, the administrator may modify the value of the port dataset signal fail attribute to the second value by using the configuration instruction. This can reduce impact on the network device, and directly and quickly recover the status of the port.

In a possible design, that the first network device determines that a recovery condition is met includes that the first network device receives M synchronization messages and M follow-up messages within first time, where M is a positive integer greater than 0. The network device determines, by determining that a synchronization message and a follow-up message that meet a requirement are received, that the recovery condition is met. This helps reduce workload of the administrator, and automatically determine that the recovery condition is met.

In a possible design, the clock message of the first type is a synchronization message, and that the first network device determines that a recovery condition is met includes that the first network device receives M synchronization messages within second time, or the clock message of the first type is a follow-up message, and that the first network device determines that a recovery condition is met includes that the first network device receives M follow-up messages within the second time, where M is a positive integer greater than 0. The network device determines, by determining that a clock message that corresponds to the first type and that meets a requirement is received, that the recovery condition is met. This helps reduce workload of the administrator, and automatically determine that the recovery condition is met.

In a possible design, that the first network device determines that a recovery condition is met includes that the first network device receives a second message, where the second message indicates that a delay response message loss state of the clock port is recovered. After the attribute value of the clock port is changed to the first value, the clock port does not send a delay request message to the corresponding master clock port. Therefore, the clock port no longer receives a delay response message. The administrator may deliver a message by using a management system, or the administrator may deliver a configuration instruction directly through a management interface of the device, to indicate that the delay response message loss state of the port is recovered. In this way, it is determined that the recovery condition is met.

In a possible design, that the first network device sets a value of a port dataset signal fail attribute of a clock port to a first value based on a case that the clock port does not receive N clock messages of a first type within a timeout interval includes that the first network device generates a first event based on the case that the clock port does not receive the N clock messages of the first type within the timeout interval, and the first network device sets the value of the port dataset signal fail attribute to the first value based on the first event.

By generating a corresponding message loss event after a message is lost, the network device may record related information of the message loss, for example, port information and a type of the lost message. The network device may also change the value of the port attribute based on the event. This is more helpful in recording a related fault and a related change on the network device.

In a possible design, that the first network device sets the value of the port dataset signal fail attribute to a second value when the first network device determines that a recovery condition is met includes, when the first network device determines that the recovery condition is met, the first network device determines that the first loss event is eliminated, and the first network device sets the value of the port dataset signal fail attribute to the second value based on a case that the first event is eliminated.

When the network device determines that the recovery condition is met, for example, a corresponding message is received or a configuration instruction is received, the network device may determine that the first loss event is eliminated, and recover the value of the port attribute by determining that the first loss event is eliminated. Further, information recorded in the first loss event may be modified. This helps record information such as fault recovery on the network device.

In a possible design, that the first network device sets the value of the port dataset signal fail attribute to the second value based on a case that the first event is eliminated includes that the first network device sets, based on the case that the first event is eliminated, a value of a port parameter corresponding to the first event of the clock port to a third value, where the third value indicates that a clock message corresponding to the port parameter is not lost, and the first network device sets the value of the port dataset signal fail attribute to the second value based on a case that the value of the clock port parameter is the third value.

In a possible design, the first event includes an identifier of the first type.

In a possible design, that the first network device sets the value of the port dataset signal fail attribute to a second value when the first network device determines that a recovery condition is met includes that the first network device sets, based on a case that it is determined that the recovery condition is met, a value of a port parameter of the clock port corresponding to the first type to a third value, where the third value indicates that a clock message corresponding to the port parameter is not lost, and the first network device sets the value of the port dataset signal fail attribute to the second value based on a case that the value of the clock port parameter is the third value.

In the foregoing descriptions, a port parameter corresponding to a message loss event is further defined on the network device, and a value of the port parameter is updated based on event information, so that a loss status of each type of message on the network device can be accurately recorded. This helps the network device recover the value of the port attribute based on the port parameter. A clearer record is obtained, and determining is easy.

In a possible design, after that the first network device sets the value of the port dataset signal fail attribute of the clock port to the first value, the method further includes that the first network device sets a value of a clock reference source Erbest dataset of the clock port to null based on a case that the value of the port dataset signal fail attribute is the first value.

In a possible design, if the value of the port dataset signal fail attribute is the first value, the first network device generates a status determining event, where the status determining event is used to indicate the first network device to determine a status of the clock port.

In a possible design, after that the first network device sets the value of the port dataset signal fail attribute to the second value, the method further includes that the first network device sets the value of the Erbest dataset to non-null.

In a possible design, before the first network device sets the value of the port dataset signal fail attribute to the first value, the value of the port dataset signal fail attribute is the second value.

In a possible design, the clock message is a Precision Time Protocol (PTP) clock message.

In the foregoing descriptions, in a manner of changing and recovering the value of the port attribute of the clock port, the network device may flexibly adjust a value of a port dataset on the network device to null or non-null, so that the network device more accurately determines the port status based on the value of the port dataset by using a BMC algorithm, to ensure correctness of the clock tracking relationship in this network.

According to a second aspect, a first network device is provided. The network device includes a processing unit and a first communication unit. The processing unit is configured to set a value of a port dataset signal fail attribute of the first communication unit to a first value based on a case that the first communication unit does not receive N clock messages of a first type within a timeout interval, where the clock message of the first type is any one of the following three types of clock messages: a synchronization message, a follow-up message, and a delay response message, N is a positive integer greater than 0, and the first value indicates that a message is lost on the first communication unit. The first communication unit is configured to communicate with a master clock port of a second network device, where a clock port status of the first communication unit is a slave port or a passive port. After the processing unit sets the value of the port dataset signal fail attribute to the first value, the processing unit is further configured to set the value of the port dataset signal fail attribute to a second value when it is determined that a recovery condition is met, where the second value indicates that no message is lost on the first communication unit.

In a possible design, the second communication unit is configured to receive a configuration instruction, where the configuration instruction is used to instruct the processing unit to set the value of the port dataset signal fail attribute to the second value, and the processing unit is further configured to determine, based on a case that the second communication unit receives the configuration instruction, that the recovery condition is met.

In a possible design, the processing unit is further configured to determine, based on a case that the first communication unit receives M synchronization messages and M follow-up messages within first time, that the recovery condition is met, where M is a positive integer greater than 0.

In a possible design, the clock message of the first type is a synchronization message, and the processing unit is further configured to determine, based on a case that the first communication unit receives M synchronization messages within second time, that the recovery condition is met, or the clock message of the first type is a follow-up message, and the processing unit is further configured to determine, based on a case that the first communication unit receives M follow-up messages within the second time, that the recovery condition is met, where M is a positive integer greater than 0.

In a possible design, the processing unit is further configured to determine, based on a case that the second communication unit receives a second message, that the recovery condition is met, where the second message indicates that a delay response message loss state of the first communication unit is recovered.

In a possible design, the processing unit is further configured to generate a first event based on the case that the first communication unit does not receive the N clock messages of the first type within the timeout interval, and the processing unit is further configured to set the value of the port dataset signal fail attribute to the first value based on the first event.

In a possible design, the processing unit is further configured to generate a first event based on the case that the first communication unit does not receive the N clock messages of the first type within the timeout interval, and the processing unit is further configured to set the value of the port dataset signal fail attribute to the first value based on the first event.

In a possible design, the processing unit is further configured to determine, based on a case that it is determined that the recovery condition is met, that the first loss event is eliminated, and the processing unit is further configured to set the value of the port dataset signal fail attribute to the second value based on a case that the first event is eliminated.

In a possible design, the processing unit is further configured to set, based on a case that the first event is eliminated, a value of a port parameter corresponding to the first event of the communication unit to a third value, where the third value indicates that a clock message corresponding to the port parameter is not lost, and the processing unit is further configured to set the value of the port dataset signal fail attribute to the second value based on a case that the value of the clock port parameter is the third value.

In a possible design, the processing unit is further configured to set, based on a case that it is determined that the recovery condition is met, a value of a port parameter of the first communication unit corresponding to the first type to a third value, where the third value indicates that a clock message corresponding to the port parameter is not lost, and the processing unit is further configured to set the value of the port dataset signal fail attribute to the second value based on a case that the value of the clock port parameter is the third value.

In a possible design, the processing unit is further configured to set a value of a clock reference source Erbest dataset of the clock port to null based on a case that the value of the port dataset signal fail attribute is the first value.

In a possible design, when the value of the port dataset signal fail attribute is the first value, the processing unit is further configured to generate a status determining event, where the status determining event is used to indicate the processing unit to determine a status of the clock port.

In a possible design, the processing unit is further configured to set the value of the Erbest dataset to non-null.

In a possible design, before the processing unit sets the value of the port dataset signal fail attribute to the first value, the value of the port dataset signal fail attribute is the second value.

According to a third aspect, an embodiment of this disclosure provides another network device, including at least one processor. The at least one processor is coupled to at least one memory. The at least one processor is configured to execute a computer program or instructions stored in the at least one memory, so that the network device performs the method according to the first aspect.

According to a fourth aspect, a chip is provided, including a processor and an interface circuit. The interface circuit is configured to receive instructions and transmit the instructions to the processor. The processor is configured to perform the method according to the first aspect.

According to a fifth aspect, a network system is provided. The system includes a first network device and a second network device. The first network device is the first network device according to the second aspect or the network device provided in the third aspect. The second network device includes a communication interface. The second network device communicates with the first network device through the communication interface. A clock port status of the communication interface is a master clock port.

According to a sixth aspect, an embodiment of this disclosure further provides a computer-readable storage medium, including a computer program. When the computer program is run on a computer, the computer is enabled to perform the method according to the first aspect.

DESCRIPTION OF EMBODIMENTS

Terms used in embodiments of this disclosure are only used to explain specific embodiments of this disclosure, but are not intended to limit this disclosure.

In a disclosure scenario of IEEE 1588, when an attribute value of a clock port of a device in a network changes, a status of the clock port changes, and therefore a clock tracking relationship changes. Consequently, the device selects an incorrect clock source for tracking.

The following briefly describes terms involved in this disclosure.

In this disclosure, terms such as "first", "second", and "third" are used to distinguish between same items or similar items that have a basically same usage and function. It should be understood that "first", "second", and "third" do not have a dependency relationship in logic or timing, and do not limit a quantity or an execution sequence either.

In this disclosure, when a value of an attribute or another message is true or false, it indicates that a meaning expressed by the value of the attribute or the message is true or false. A specific manifestation may be using one or more flag bits or another form for expression. This is not limited in this disclosure.

In the telecommunications field, the International Telecommunication Union (ITU)—Telecommunication Standardization Sector (ITU-T) defines two standards, namely, ITU-T G.8275.1 and ITU-T G.8275.2, based on an IEEE 1588v2 protocol and with reference to a unique scenario in the telecommunications field, where G indicates a series of recommended standards in a chapter related to transmission systems and media, digital systems and networks in the ITU-T.

The ITU-T G.8275.1 is applied to a mobile bearer network in which all devices support a 1588 protocol. The ITU-T G.8275.2 is applied to a mobile bearer network in which some devices support the 1588 protocol. The ITU-T G.8275.1 and the ITU-T G.8275.2 have a same principle for selection of a 1588 reference clock source. For example, in a scenario in which a device has a plurality of 1588 clock input sources, an optimal 1588 clock source needs to be selected by using a BMC algorithm for tracking, to determine a master clock port, a slave clock port, or a passive clock port of the device. The master clock port, the slave clock port, and the passive clock port may also be referred to as a master port, a slave port, and a passive port. A clock tracking relationship formed by determining a clock port of a device in a network by using the device may be shown in FIG. 1.

Figure 1:
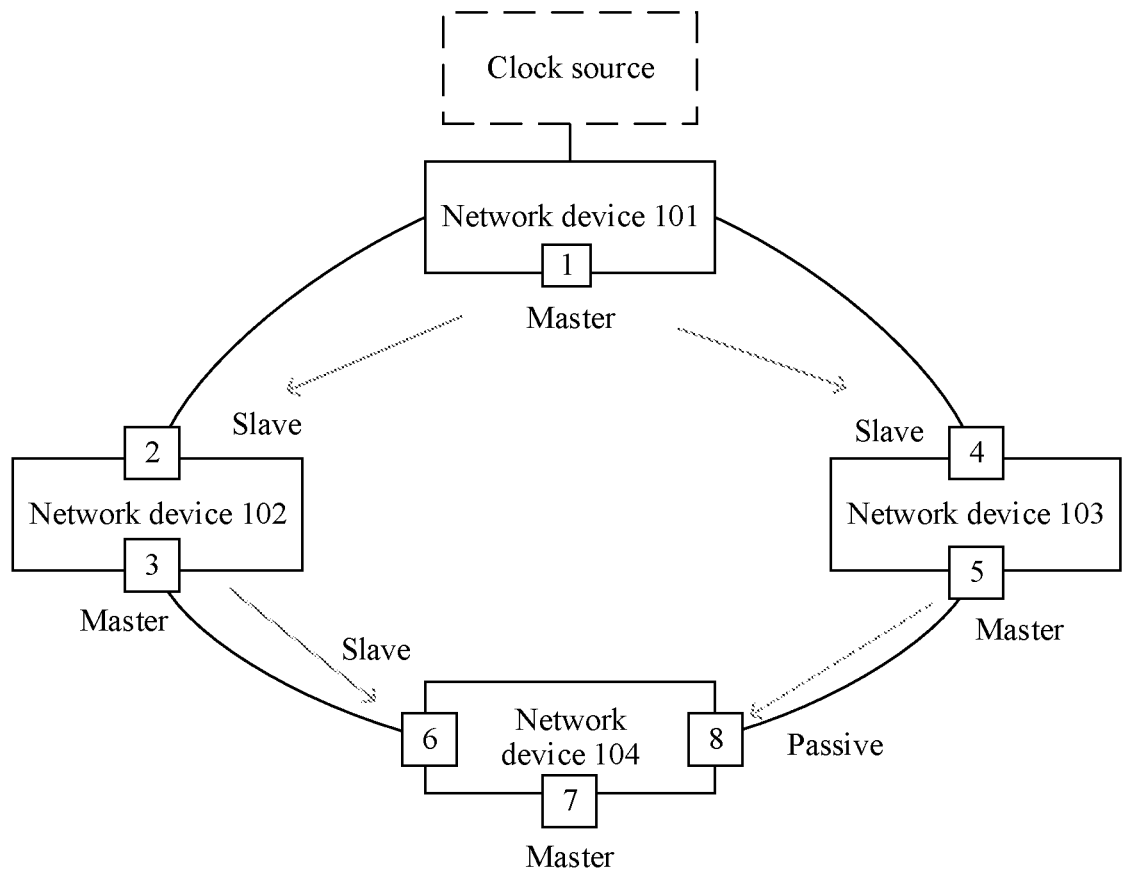
FIG. 1 is a schematic diagram of a scenario of a clock tracking relationship according to an embodiment of this disclosure.

FIG. 1 is a schematic diagram of a scenario of a clock tracking relationship according to this disclosure. FIG. 1 shows a network including four network devices. In the network, a network device 101 is connected to a clock source, the network device 101 is connected to a network device 102 and a network device 103, the network device 102 is connected to the network device 101 and a network device 104, the network device 103 is connected to the network device 101 and the network device 104, and the network device 104 is connected to the network device 101 and the network device 103. A master port determined by the network device 101 is a port 1. A slave port determined by the network device 102 is a port 2, and a master port determined by the network device 102 is a port 3. A slave port determined by the network device 103 is a port 4, and a master port determined by the network device 103 is a port 5. A slave port determined by the network device 104 is a port 6, a master port determined by the network device 104 is a port 7, and a passive port determined by the network device 104 is a port 8. A clock tracking relationship formed by the network is as follows: the network device 101→the network device 102→the network device 104, and the network device 101→the network device 103.

Figure 2A:
FIG. 2A is a schematic diagram of a clock tracking relationship according to an embodiment of this disclosure.

The tracking relationship may be simply shown in FIG. 2A. A second network device receives, through a slave port (the port 2), a clock message sent by a first network device through a port (the port 1), and responds to the clock message, to synchronize clock information. Clock messages sent between devices mainly include an announce message, a synchronization (sync) message, a follow-up (follow_up) message, a delay request (delay_req) message, and a delay response (delay_resp) message.

The announce message is mainly used by a BMC source selection algorithm to determine whether a port status is a master state, a slave state, or a passive state. When a device is recently powered on, a port status is an initializing state. Then ports send announce messages to each other. After the device determines a port status (master, slave, or the like) by using the BMC source selection algorithm, only a master port sends an announce message, and a slave port does not send an announce message. When information of an announce message received by the slave port changes or the slave port fails to receive an announce message, a port status is recalculated and a status of each port is updated in the BMC source selection algorithm.

Figure 3A:
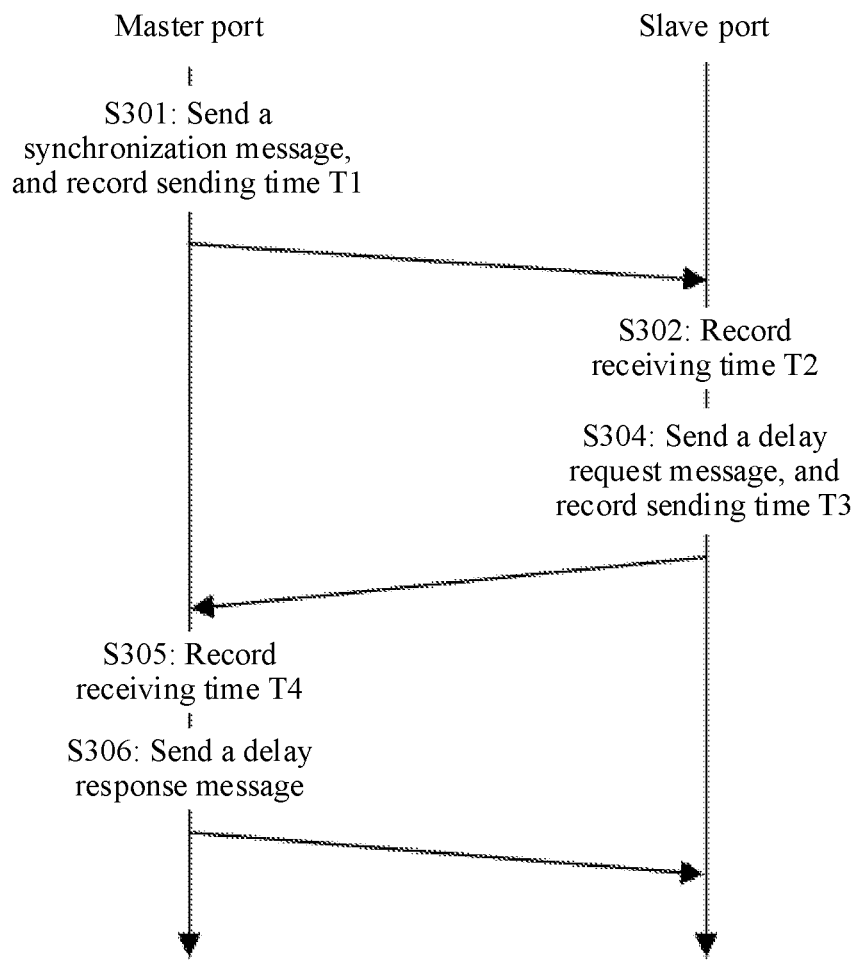
FIG. 3A is a schematic flowchart of clock synchronization according to an embodiment of this disclosure.
Figure 3B:
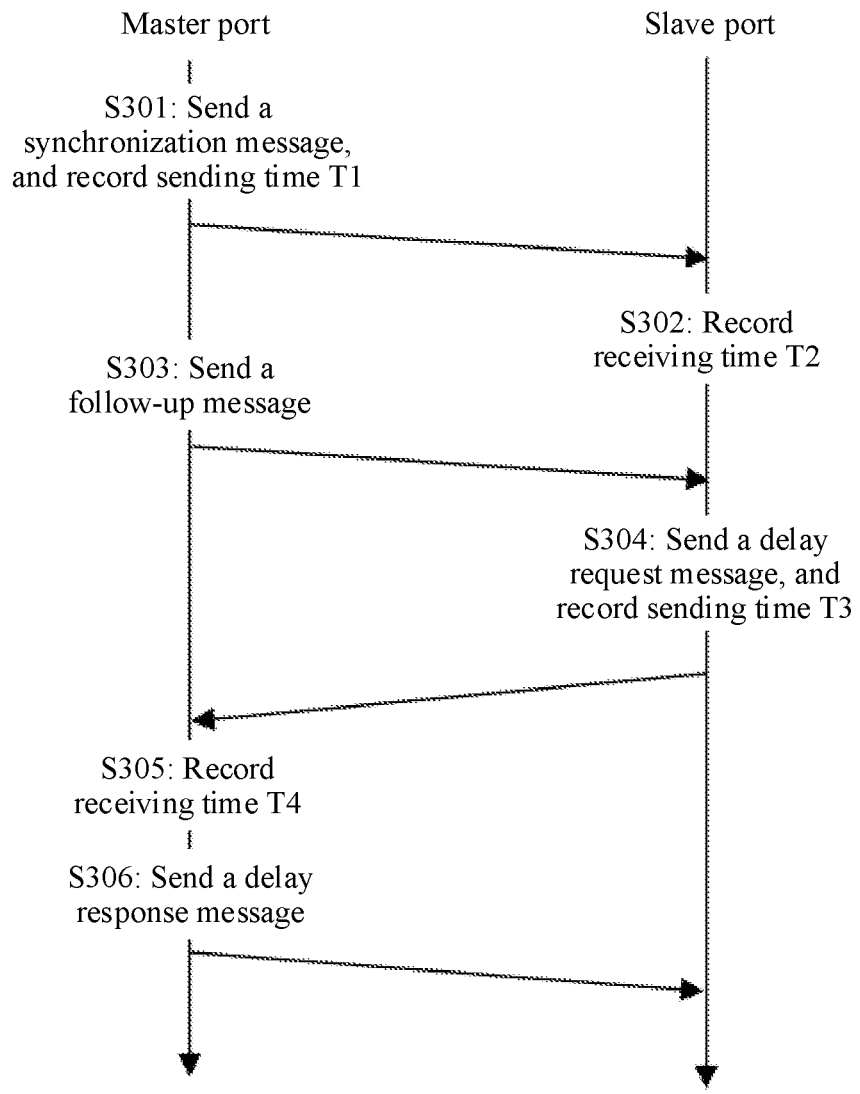
FIG. 3B is a schematic flowchart of clock synchronization according to an embodiment of this disclosure.

The sync message, the follow_up message, the delay_req message, and the delay_resp message are mainly used for time synchronization. There are mainly two manners of synchronizing time information between network devices: a one-step mode shown in FIG. 3A and a two-step mode shown in FIG. 3B. The following provides descriptions mainly with reference to a master port and a slave port. Interaction between the master port and a passive port is also similar to this, and details are not described again. A detailed process is as follows.

S301: The master port sends a sync message to the slave port, and records sending time T1 when sending the sync message. If the master port is configured as a one-step mode, T1 is filled in a field of the sync message, and the sync message is sent to the slave port.

S302: After receiving the sync message, the slave port records receiving time T2.

S303: If the master port is configured as a two-step mode, the master port immediately sends a follow up message after sending the sync message. In this case, T1 is filled in a field of the follow_up message, and the follow_up message is sent to the slave port.

In the foregoing descriptions, S302 may be performed before S303, or S302 may be performed after S303.

S304: After the slave port is configured as an End-to-End (E2E) mechanism, the slave port sends a delay_req message to the master port, and records sending time T3.

S305: After receiving the delay_req message, the master port records receiving time T4, fills T4 in a field of a delay_resp message, and then sends the delay_resp message to the slave port.

S306: After receiving the delay_resp message, the slave port obtains T4. Therefore, a time error (TE) between the slave port and the master port may be calculated based on T1, T2, T3, and T4. The time error may be obtained by using the following formula:

$TE=[(t2-t1)-(t4-t3)]/2$.

A packet timing signal fail (PTSF) function is further defined in a G.8275.2 standard. The function is used when a message is lost on a clock port, and includes the following two events:

(1) PTSF-loss synchronization (PTSF-losssync) event: When the slave port detects that any one of three types of messages (the sync message, the follow up message, or the delay_resp message) is lost, the slave port needs to generate a PTSF-losssync event.

(2) PTSF-unusable event: When detecting that a time error TE calculated based on timestamps generated by an input sync message, follow up message, and delay_resp message exceeds a requirement, the slave port generates a PTSF-unusable event.

Figure 2B:
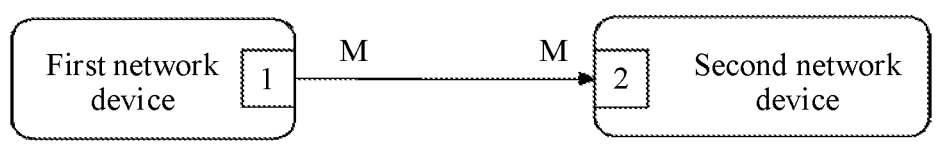
FIG. 2B is a schematic diagram of a clock tracking relationship according to an embodiment of this disclosure.

When (1) or (2) occurs, the network device sets a value of a port dataset signal fail (portDS.SF) attribute of the slave port to true. The value of portDS.SF is further used to indicate whether the port fails. When the value of portDS.SF is true, a clock reference source (Erbest) dataset of the slave port is set to null. Then a BMC algorithm is triggered to recalculate a port status, and the port is set to a master state, so that the clock port cannot participate in clock source selection. To be specific, a status of the port 2 of the second network device in FIG. 2A changes to a master port state shown in FIG. 2B. The port 2 of the second network device changes to the master state, and after a fault is rectified, the port 2 continues to receive a sync message and a follow up message that are sent by the first network device (the follow_up message is received only when the clock tracking relationship is configured as the two-step mode). However, in this case, because the port 2 does not send a delay_req message to the port 1 of the first network device, the first network device does not send a delay_resp message to the port 2 of the second network device, and the port 2 of the second network device cannot receive the delay_resp message. Therefore, a PTSF-losssync event on the port 2 of the second network device cannot be eliminated, and a value of portDS.SF of a port dataset of the port is still true. To be specific, if no special technical means is used, when the value of portDS.SF of the port dataset of the port is true, a value of an Erbest dataset of the port is not set to non-null. Consequently, the port cannot be recovered to a slave state again when the device determines a port status by using the BMC algorithm. However, if portDS.SF is false, the device does not set the reference source dataset Erbest of the port to a null set. Therefore, clock source selection of the port is not affected.

The foregoing example is described only by using the slave port, but is also applicable to a passive port.

To be specific, when a value of portDS.SF of a clock port is true, the port cannot be used as one of ports for clock source selection, and the clock tracking relationship in the network is affected. In view of this, a technical solution is provided in the present disclosure. In addition to the 1588 standard ITU-T G.8275.2 for telecommunications, the technical solution may be applied to the 1588 standard ITU-T G.8275.1 for telecommunications, and may be further applied to the 1588 base protocol IEEE 1588, the 1588 standard IEEE C37.238 in the telecommunications field, the 1588 standard SMPTE 2059 of the Society of Motion Picture and Television Engineers (SMPTE), and the like.

Figure 4:
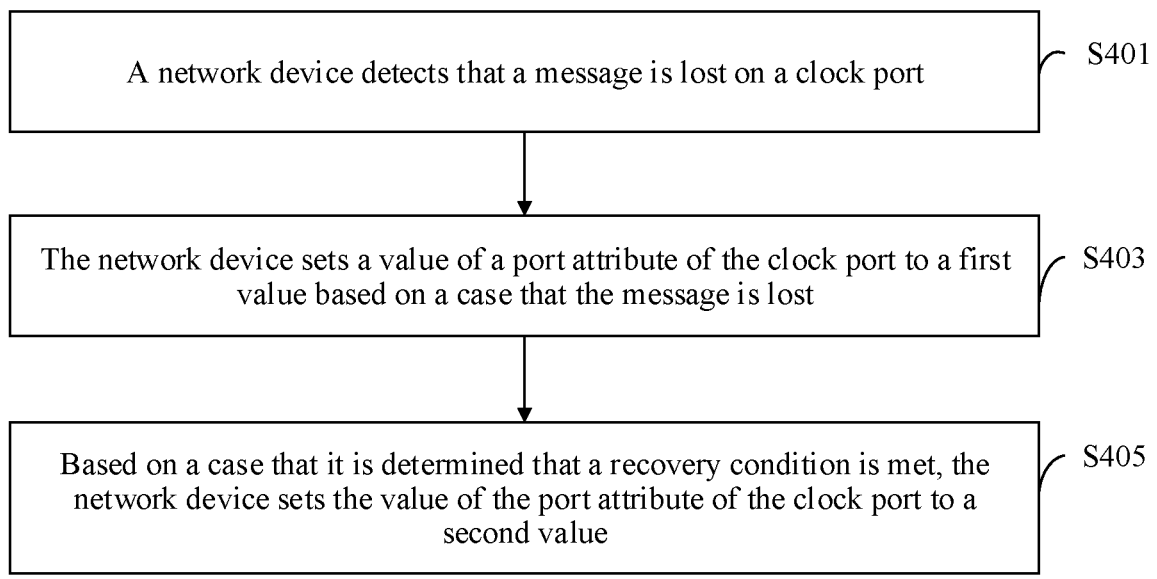
FIG. 4 is a flowchart of a clock port status recovery method according to an embodiment of this disclosure.

With reference to the scenario shown in FIG. 1, the following describes, by using an example, several possible implementations of a method provided in an embodiment of this disclosure. The network device 104 is used as a network device herein for description. As shown in FIG. 4, a method for implementing clock port status recovery includes the following steps.

S401: The network device detects that a message is lost on a clock port within a timeout interval.

If the network device 104 determines that a clock port of the network device 104, for example, the port 6 or the port 8, does not receive N clock messages of a first type within a specific timeout interval, the network device 104 generates a message loss event. The timeout interval may be a specified specific timeout interval, for example, the specified timeout interval is 6 seconds (s), or may be a multiple of a time interval for receiving a specific type of message, for example, when time for receiving a specific type of message is 3 s, the timeout interval may be three times the receiving time interval, in other words, is finally 9 s. N may be a specified quantity of lost clock messages. For example, the value may be a quantity configured on the network device 104 by a network administrator by delivering a configuration instruction by using a management system or a management interface, or specified in a 1588 clock protocol, or is a specific value preset when the network device 104 is manufactured and delivered from a factory. A value of N is an integer greater than or equal to 1. In some cases, a value range of N may be 3≤N≤255. The first type may be any message type in a synchronization message, a follow-up message, and a delay response message. When a clock synchronization operating mechanism on the network device 104 is a one-step mode, the follow-up message does not need to be considered. When the clock synchronization operating mechanism configured on the network device is a two-step mode, the follow-up message needs to be considered. To be specific, in the one-step mode, if the network device determines that any slave or passive port on the network device does not receive N messages of one of the following two types within the timeout interval: a synchronization message and a delay response message, it is determined that a message is lost on the clock port. Alternatively, in the two-step mode, if the network device determines that any slave or passive port on the network device does not receive N messages of one of the following three types within the timeout interval: a synchronization message, a follow-up message, and a delay response message, it is determined that a message is lost on the clock port. In the following descriptions, in this embodiment of this disclosure, when the network device recovers an attribute value of the clock port, a received message needs to be consistent with that herein. To be specific, in the one-step mode, only a status of whether a synchronization message and a delay response message are received is determined, or in the two-step mode, a status of whether a synchronization message, a follow-up message, and a delay response message are received is determined. This is not described in detail again in other embodiments of this disclosure.

Optionally, when the network device detects that a message is lost on a clock port of the device, the network device generates a message loss event. In an example, the message loss event is a PTSF-losssync event. The message loss event indicates that a message is lost on the clock port, and a type of a lost clock message may be any one or more of a synchronization message, a follow-up message, or a delay response message.

Optionally, the message loss event further includes an indication of the type of the lost clock message.

In an example, the message loss event includes a field indicating the type of the lost clock message, and the field indicates an event that is lost on the clock port.

In another example, the message loss event may include three type fields: a synchronization message type, a follow-up message type, and a delay response type. When a value of a corresponding type field is set to a special value, for example, 1, it is considered that a clock message of the type is lost.

Optionally, when another type of clock message is further lost on the clock port after a first type of clock message is lost on the clock port, the network device may update information of a second type field of the loss event to the event, or generate another message loss event.

S403: The network device sets a value of a port attribute of the clock port to a first value based on a case that it is detected that a message is lost on the clock port.

The network device 104 sets a value of portDS.SF of the port 6 to the first value based on a case that a message is lost on the port 6.

Optionally, the network device 104 may alternatively set the value of portDS.SF of the port to the first value based on the message loss event. The network device 104 may set the value of portDS.SF of the port to the first value while generating the message loss event or after generating the message loss event.

In an example, the first value is true.

Optionally, the clock port of the network device further has a port parameter corresponding to a message type. When the network device detects that a message is lost on the clock port of the device, the network device sets a value of the port parameter to true, to indicate that a message of a corresponding type is lost on the clock port.

Optionally, the network device may alternatively set the value of the port parameter to true based on the message loss event.

S405: After the value of portDS.SF is set to the first value, the network device sets the value of portDS.SF of the clock port to a second value when determining that a recovery condition is met.

The recovery condition includes, when the port 6 of the network device 104 receives clock messages of both of the following two types of messages: a synchronization message and a follow-up message, and continuously receives M clock messages of each type, the network device or a management and maintenance person determines that a corresponding message loss event is recovered. M may be a specified quantity of lost clock messages. For example, the value may be a quantity configured on the network device by a network administrator or specified in a 1588 clock protocol, or a specific value preset when the network device is manufactured and delivered from a factory. A value of M is an integer greater than or equal to 1. In some cases, a value range of M may be $2 \leq M \leq 255$. Being continuously received means that, when a message transmission rate of a master port tracked by the port 6 is one message per second, it is considered that the recovery condition is met when the port 6 receives two synchronization messages within two consecutive seconds and receives two follow-up messages within two consecutive seconds, and the synchronization messages and the follow-up messages are received within a determined message transmission interval, for example, two synchronization messages and two follow-up messages are received within four seconds.

In an example, the port attribute is configurable. When the management and maintenance person determines that the network device meets the recovery condition, the administrator may deliver a configuration instruction to the network device through configuration, where the configuration instruction instructs the network device 104 to set the value of the port attribute of the port 6 to the second value.

Optionally, after the network device generates the message loss event when detecting that the message is lost on the clock port, and modifies the value of portDS.SF to the first value based on the message loss event, the message loss event is eliminated after the network device receives the foregoing messages. The network device may set the value of portDS.SF of the clock port to the second value based on a case that the message loss event is eliminated.

In an example, the clock port has two configurable port parameters, for example, a port signal fail-synchronization message loss (portDS.SF.losssync) attribute and a port signal fail-unusable (portDS.SF.unusable) attribute. Values of the port parameters may be any value capable of indicating true or false. When a PTSF-losssync event occurs and after a fault is rectified, portDS.SF.losssync of the port may be set to false through manual configuration. When a PTSF-unusable event occurs and after a fault is rectified, portDS.SF.unusable of the port may be set to false through manual configuration. When both portDS.SF.losssync and portDS.SF.unusable of the port are false, the network device 104 automatically sets the value of the port attribute portDS.SF to false. The device no longer sets a reference source dataset Erbest of the port 6 to a null set. Therefore, a BMC algorithm is triggered to re-update a status of the port to a slave state or another state. In an example, the second value is false.

Optionally, when the network device further has a port parameter corresponding to the message type or the message loss event, the network device sets a value of a corresponding port parameter to false after receiving the foregoing messages. The network device may set the value of portDS.SF of the clock port to the second value based on a case that values of all port parameters are false.

In this case, because the clock port may receive the synchronization message and the follow-up message when the fault is rectified, after the clock port receives the synchronization message and the follow-up message, the network device may automatically change values of port parameters corresponding to the message types to false. However, because the status of the clock port has changed to master, the clock port does not send a delay request message to a master port connected to the clock port, and the clock port does not receive a delay response message. In this case, a corresponding port parameter may be defined for the delay response message. When the delay response message is lost on the clock port, a value of this parameter is set to true. After the value of portDS.SF of the clock port is modified to true due to the loss of the delay response message, the network administrator may modify the value of the parameter to false by default. In this way, the network device may automatically modify the value of portDS.SF of the clock port to false after receiving the synchronization message and/or the follow-up message. Certainly, the network administrator may alternatively configure some policies to automatically modify the value of the port parameter to false.

Figure 5A:
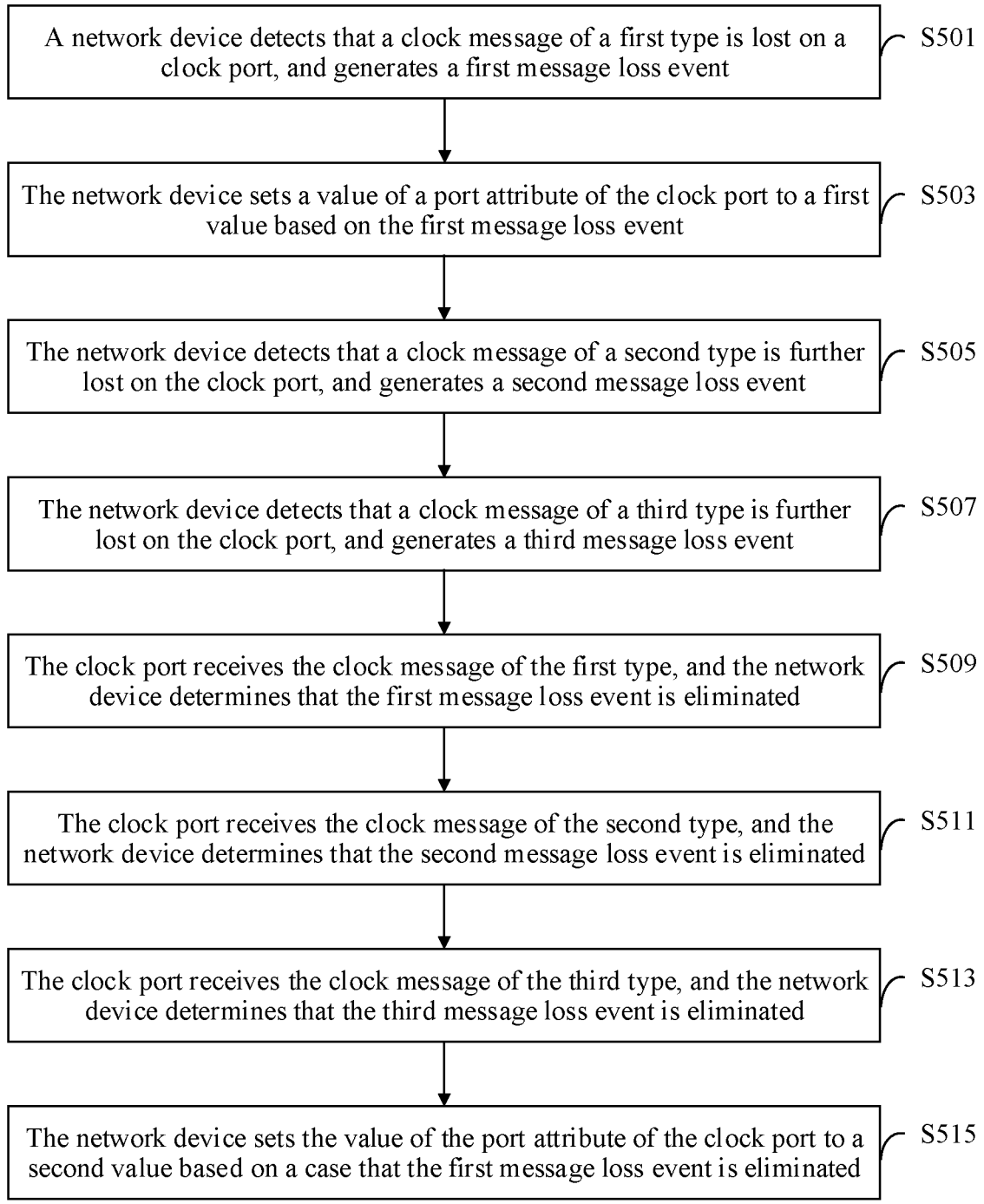
FIG. 5A is a flowchart of a clock port status recovery method according to an embodiment of this disclosure.

Still with reference to the scenario shown in FIG. 1, the following describes, by using an example, several possible implementations of a method provided in an embodiment of this disclosure. The network device 104 is used as a network device herein for description. A method in a method embodiment shown in FIG. 5A is similar to the method in the method embodiment shown in FIG. 4. For related content, refer to the descriptions of FIG. 4. Different parts are described in detail herein. As shown in FIG. 5A, a method for implementing clock port status recovery includes the following steps.

S501: The network device detects that a clock message of a first type is lost on a clock port, and generates a first message loss event.

If the network device 104 detects that the clock message of the first type is lost on a slave port or a passive port of the network device 104, for example, the port 6 or the port 8, the network device 104 generates the first message loss event. As described in S401, that the network device 104 detects that the clock message of the first type is lost may include detecting that the port 6 or the port 8 of the network device 104 does not receive N clock messages of the first type within a timeout interval. For details, refer to S401. Details are not described herein again.

In an example, when the first type is a synchronization message, the network device 104 generates the first message loss event. The message loss event is a loss synchronization event, and may also be referred to as a PTSF-loss synchronization event (PTSF-loss-sync-message). The event is used to indicate that a synchronization message is lost on the port 6 or the port 8.

In another example, when the first type is a follow-up message, the network device 104 generates the first message loss event. The message loss event is a loss follow-up event, and may also be referred to as a PTSF-loss follow-up event (PTSF-loss-follow-up-message). The event is used to indicate that a follow-up message is lost on the port 6 or the port 8.

In another example, when the first type is a delay response message, the network device 104 generates the first message loss event. The message loss event is a loss delay response event, and may also be referred to as a PTSF-loss delay response event (PTSF-loss-delay-resp-message). The event is used to indicate that a delay response message is lost on the port 6.

S503: The network device sets a value of a port attribute of the clock port to a first value based on the first message loss event.

For example, the port attribute is a PTSF attribute. When the network device 104 generates a PTSF-loss synchronization event for the port 6, or after the network device 104 receives a PTSF-loss synchronization event generated by the port 6 or the port 8, the network device 104 sets a value of the PTSF attribute of the port 6 to true.

S505 (Optional): If the network device further detects that a clock message of a second type is further lost on the clock port, the network device generates a second message loss event.

In an example, N clock messages of the second type are further lost on the port 6 or the port 8 of the network device 104, and the clock messages of the second type are clock messages different from those of the first type.

S507 (Optional): If the network device further detects that a clock message of a third type is further lost on the clock port, the network device generates a third message loss event.

In an example, N clock messages of the third type are further lost on the port 6 or the port 8 of the network device 104, and the clock messages of the third type are clock messages different from those of the first type and the second type.

Occurrence time of steps S505 and S507 and step S501 is not limited. To be specific, the clock message of the first type may be any one of a synchronization message, a follow-up message, and a delay response message, the clock message of the second type is any one of the three types of clock messages that is different from the first type, and the clock message of the third type is one of the three types of clock messages that is different from the first type and the second type. An occurrence sequence of various types of message loss is not limited. When any type of clock message loss event occurs, the network device 104 may set the value of the PTSF port attribute to true.

S509: The clock port of the network device receives the clock message of the first type, and the network device determines that the first message loss event is eliminated.

In an example, when the first type is a synchronization message, after the port 6 of the network device 104 continuously receives M synchronization messages, the network device 104 may generate a synchronization message loss elimination event, and the network device determines, based on the synchronization message loss elimination event, that the first message loss event is eliminated.

In another example, when the first type is a synchronization message, after the port 6 of the network device 104 continuously receives M synchronization messages, the network device 104 determines that the first message loss event is eliminated.

In another example, when the first type is a follow-up message, after the port 6 of the network device 104 continuously receives M follow-up messages, the network device 104 may generate a follow-up message loss elimination event, and the network device determines, based on the follow-up message loss elimination event, that the first message loss event is eliminated.

In another example, when the first type is a delay response message, after the port 6 of the network device 104 continuously receives M delay response messages, the network device 104 determines that a delay response message loss event is eliminated, and the network device determines, based on the delay response message loss elimination event, that the first message loss event is eliminated.

S511 (Optional): The clock port of the network device receives the clock message of the second type, and the network device determines that the second message loss event is eliminated.

Corresponding to S505, when the network device determines that an event that the clock message of the second type is lost exists, and when the clock port of the network device receives the clock message of the second type, the network device determines that the second message loss event is eliminated.

In an example, when the second type is a synchronization message, after the port 6 of the network device 104 receives M synchronization messages, the network device 104 may generate a synchronization message loss elimination event, and the network device determines, based on the synchronization message loss elimination event, that the second message loss event is eliminated.

In another example, when the second type is a synchronization message, after the port 6 of the network device 104 receives M synchronization messages, the network device 104 does not need to generate a synchronization message loss elimination event, and the network device 104 determines that the second message loss event is eliminated.

In another example, when the second type is a follow-up message, after the port 6 of the network device 104 receives M follow-up messages, the network device 104 may generate a follow-up message loss elimination event, and the network device determines, based on the follow-up message loss elimination event, that the second message loss event is eliminated.

In another example, when the second type is a delay response message, after the port 6 of the network device 104 receives M delay response messages, the network device 104 does not need to generate a delay response message loss elimination event, and the network device 104 determines that the second message loss event is eliminated.

The network device considers, based on a case that the second message loss event is eliminated, that the second message loss event is recovered.

S513 (Optional): The clock port of the network device receives the clock message of the third type, and the network device determines that the third message loss event is eliminated.

Corresponding to S507, when the network device determines that an event that the clock message of the third type is lost exists, and when the clock port of the network device receives the clock message of the third type, the network device determines that the second message loss event is eliminated.

In an example, when the third type is a synchronization message, after the port 6 of the network device 104 receives M synchronization messages, the network device 104 may generate a synchronization message loss elimination event, and the network device determines, based on the synchronization message loss elimination event, that the third message loss event is eliminated.

In another example, when the third type is a synchronization message, after the port 6 of the network device 104 receives M synchronization messages, the network device 104 does not need to generate a synchronization message loss elimination event, and the network device 104 determines that the third message loss event is eliminated.

In another example, when the third type is a follow-up message, after the port 6 of the network device 104 receives M follow-up messages, the network device 104 may generate a follow-up message loss elimination event, and the network device determines, based on the follow-up message loss elimination event, that the third message loss event is eliminated.

In another example, when the third type is a delay response message, after the port 6 of the network device 104 receives M delay response messages, the network device 104 does not need to generate a delay response elimination event, and the network device 104 determines that the third message loss event is eliminated.

The network device considers, based on a case that the third message loss event is eliminated, that the third message loss event is recovered.

S515: The network device sets the value of the port attribute of the clock port to a second value based on a case that the first message loss event is eliminated.

When only the first message loss event exists on the network device 104, the network device 104 determines, based on a case that the first message loss event on the port 6 is eliminated, that the first message loss event is recovered, and sets the value of the port attribute of the clock port to the second value based on the case that the first message loss event is eliminated.

When the second message loss event further exists on the port 6 of the network device 104, the network device 104 sets the value of the port attribute of the clock port to the second value based on the case that the first message loss event is eliminated and the second message loss event is eliminated.

When the third message loss event further exists on the port 6 of the network device 104, the network device 104 sets the value of the port attribute of the clock port to the second value based on the case that the first message loss event is eliminated, the second message loss event is eliminated, and the third message loss event is eliminated. In an example, when the network device 104 is configured as the one-step mode, the network device 104 sets the value of the port attribute of the clock port to the second value based on a case that the loss synchronization event is eliminated and the loss delay response event is eliminated, or when the network device 104 is configured as the two-step mode, the network device 104 sets the value of the port attribute of the clock port to the second value based on a case that the loss synchronization event is eliminated, the loss delay response event is eliminated, and the loss follow-up event is eliminated.

Figure 5B:
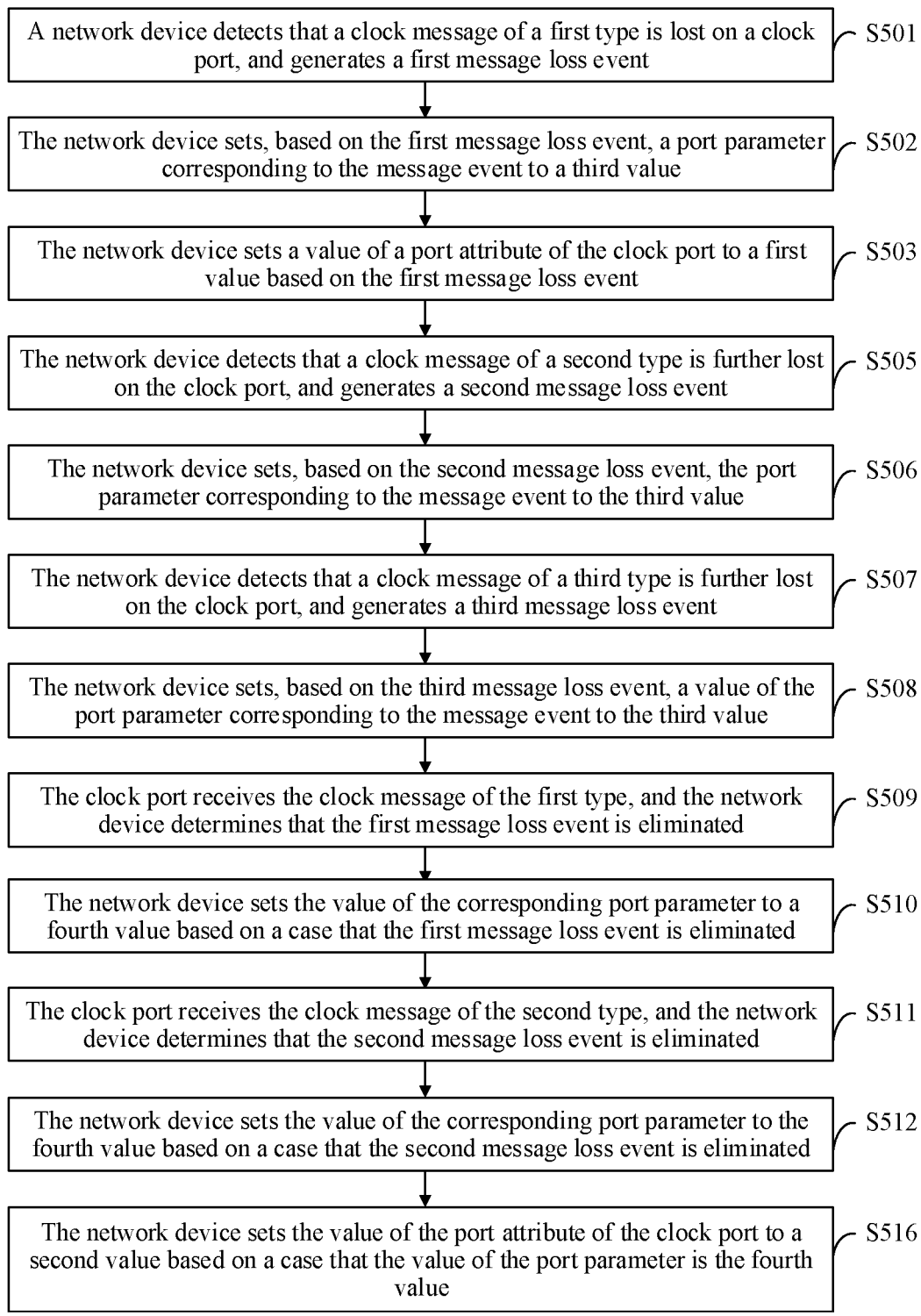
FIG. 5B is a flowchart of a clock port status recovery method according to an embodiment of this disclosure.

Still with reference to the scenario shown in FIG. 1, the following describes, by using an example, several possible implementations of a method provided in an embodiment of this disclosure. The network device 104 is used as a network device herein for description. A method in a method embodiment shown in FIG. 5B is similar to the method in the method embodiment shown in FIG. 5A. For detailed content, refer to the descriptions of FIG. 5A. Only different parts are described in detail herein. As shown in FIG. 5B, a method for implementing clock port status recovery includes the following steps.

S502: After the network device 104 generates the first message loss event, the network device 104 sets, based on the first message loss event, a value of a port parameter corresponding to the message loss event to a third value, where the third value herein may be true, and the third value is used to indicate that a clock message of a corresponding type is lost on the clock port.

In an example, when the first message loss event is a loss synchronization event, the port parameter corresponding to the event is a loss synchronization parameter that may also be referred to as a port dataset signal fail attribute.loss synchronization parameter (portDS.SF.loss-sync-message). In other words, a message type corresponding to the port parameter is a synchronization message. The value of the port parameter is the third value, and this indicates that a synchronization message is lost on the port.

When the first message loss event is a loss follow-up event, the port parameter corresponding to the event is a loss follow-up parameter that may also be referred to as a port dataset signal fail attribute.loss follow-up parameter (portDS.SF.loss-follow-up-message). In other words, a message type corresponding to the port parameter is a follow-up message. The value of the port parameter is the third value, and this indicates that a delay follow-up message is lost on the port.

When the first message loss event is a loss delay response event, the port parameter corresponding to the event is a loss delay response parameter that may also be referred to as a port dataset signal fail attribute.loss delay response parameter (portDS.SF.loss-delay-resp-message). In other words, a message type corresponding to the port parameter is a delay response message. The value of the port parameter is the third value, and this indicates that a delay response message is lost on the port.

S503: The network device sets a value of a port attribute of the clock port to a first value based on the first message loss event.

Refer to the descriptions of S503 in FIG. 5A. Herein, the network device may set the value of the port attribute of the clock port to the first value based on the first message loss event, or may set the value of the port attribute of the clock port to the first value based on a case that the value of the port parameter is the third value.

S506 and S508: Refer to the descriptions of S502.

S510: The network device sets the value of the corresponding port parameter to a fourth value based on a case that the first message loss event is eliminated.

The network device 104 sets, based on the case that the first message loss event is eliminated, the value of the port parameter corresponding to the message loss event to the fourth value, where the fourth value herein may be false, and the fourth value indicates that a clock message of a type corresponding to the port parameter is properly received.

In an example, when the first message loss event is a loss synchronization event or a loss follow-up event, the network device may directly and automatically set, based on a case that the corresponding message loss event is eliminated, the value of the port parameter corresponding to the message loss event to the fourth value, or when the first message loss event is a loss delay response event, the network device 104 may set the value of the loss delay response parameter to the fourth value by using a received configuration instruction. The configuration instruction may be a configuration instruction delivered by a network administrator to the network device 104 by using a management system, a management interface, or the like.

S512: Refer to S510.

S516: The network device sets the value of the port attribute of the clock port to a second value based on a case that the value of the port parameter is the fourth value.

When the value of the port parameter corresponding to the first message loss event is the fourth value, it indicates that the first message loss event is recovered. When values of all related port parameters of the network device are the fourth value, the network device sets the value of the port attribute of the clock port to the second value. In an example, when the network device 104 is configured as the one-step mode, the network device 104 sets the value of the port attribute of the clock port to the second value based on a case that values of the loss synchronization parameter and the loss delay response parameter are the fourth value, or when the network device 104 is configured as the two-step mode, the network device 104 sets the value of the port attribute of the clock port to the second value based on a case that values of the loss synchronization parameter, the loss delay response parameter, and the loss follow-up parameter are the fourth value.

Figure 6A:
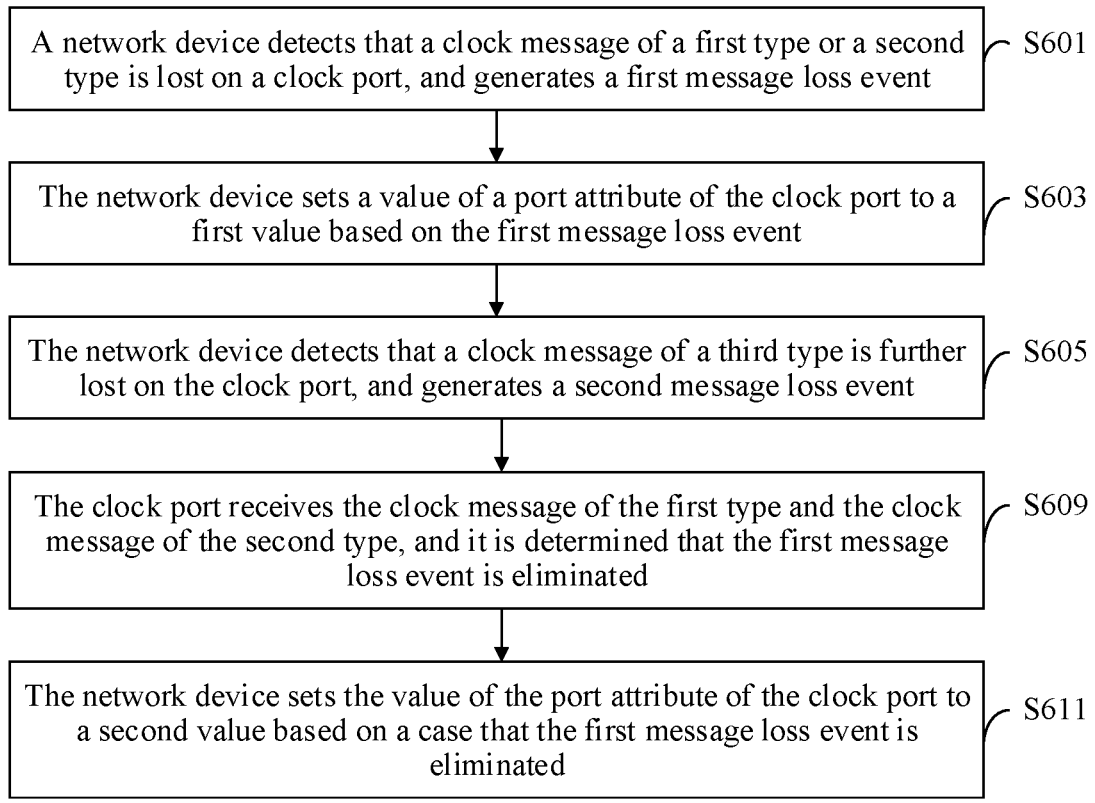
FIG. 6A is a flowchart of a clock port status recovery method according to an embodiment of this disclosure.

Still with reference to the scenario shown in FIG. 1, the following describes, by using an example, several possible implementations of a method provided in an embodiment of this disclosure. The network device 104 is used as a network device herein for description. A method in a method embodiment shown in FIG. 6A is similar to the method in the method embodiment shown in FIG. 5A. For detailed content, refer to the descriptions of FIG. 5A. Only different parts are described in detail herein. As shown in FIG. 6A, a method for implementing clock port status recovery includes the following steps.

S601: The network device detects that a clock message of a first type or a second type is lost on a clock port, and generates a first message loss event.

The clock message of the first type or the second type may be a synchronization message or a follow-up message. In other words, after detecting either of the synchronization message and the follow-up message, the network device generates the first message loss event. In an example, the message loss event is a loss synchronization event.

For other related information, refer to S501.

S603: The network device sets a value of a port attribute of the clock port to a first value based on the first message loss event.

S605: The network device detects that a clock message of a third type is further lost on the clock port, and generates a second message loss event.

The clock message of the third type may be a delay response message, and correspondingly, the second message loss event may be a loss delay response message.

An execution sequence of step S605 and step S601 may be reversed. S603 needs to be performed only after either of S601 and S605, and an execution sequence of the other step and S603 is not limited.

S609: The clock port of the network device receives the clock message of the first type and the clock message of the second type, and the network device determines that the first message loss event is eliminated.

In an example, when the first type is a synchronization message and the second type is a follow-up message, and when the network device 104 is configured as the one-step mode, after the port 6 of the network device 104 receives M synchronization messages, the network device 104 may generate a synchronization message loss elimination event, or when the network device 104 is configured as the two-step mode, after the port 6 of the network device 104 receives M synchronization messages and M follow-up messages, the network device 104 may generate a synchronization message loss elimination event. The sync message on the port 6 of the network device 104 carries a one-step or two-step flag bit.

The network device determines, based on the synchronization message loss elimination event, that the first message loss event is eliminated.

In another example, when the first type is a synchronization message and the second type is a follow-up message, and when the network device 104 is configured as the one-step mode, after the port 6 of the network device 104 receives M synchronization messages, the network device 104 determines that the first message loss event is eliminated.

S611: The network device sets the value of the port attribute of the clock port to a second value based on a case that the first message loss event is eliminated.

The network device may set the value of the port attribute of the clock port to the second value only based on the case that the first message loss event is eliminated, or may set the value of the port attribute of the clock port to the second value based on the case that the first message loss event is eliminated and the second message loss event is eliminated.

Figure 6B:
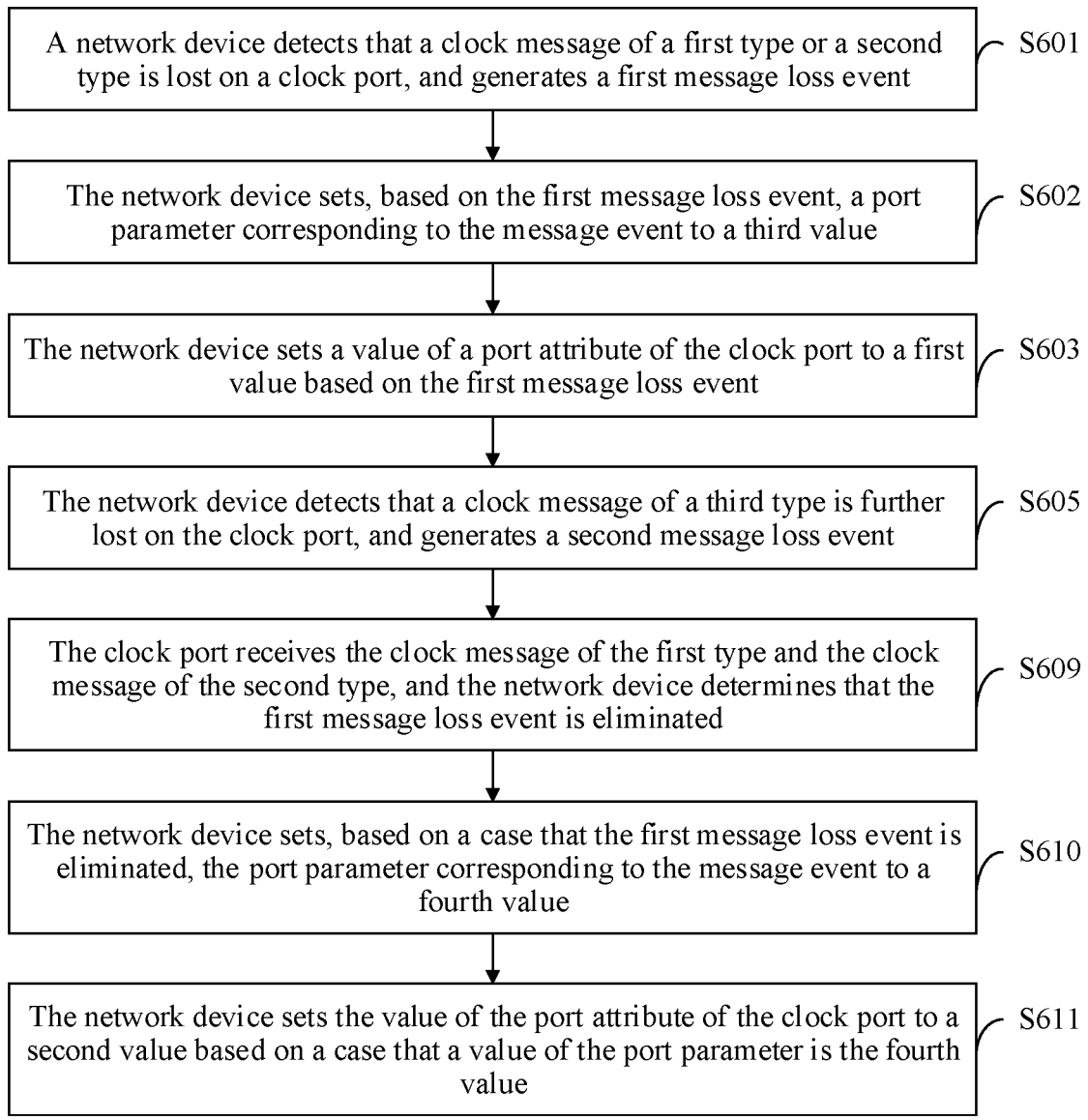
FIG. 6B is a flowchart of a clock port status recovery method according to an embodiment of this disclosure.

Still with reference to the scenario shown in FIG. 1, the following describes, by using an example, several possible implementations of a method provided in an embodiment of this disclosure. The network device 104 is used as a network device herein for description. A method in a method embodiment shown in FIG. 6B is similar to the method in the method embodiment shown in FIG. 6A. For detailed content, refer to the descriptions of FIG. 6A. Only different parts are described in detail herein. As shown in FIG. 6B, a method for implementing clock port status recovery includes the following steps.

S602: The network device sets, based on the first message loss event, a port parameter corresponding to the message event to a third value.

In an example, when the first message loss event is a loss synchronization event, the port parameter corresponding to the event is a loss synchronization parameter that may also be referred to as a port dataset signal fail attribute.loss synchronization parameter (portDS.SF.loss-sync-message). The value of the port parameter is the third value, and this indicates that a synchronization message or a follow-up message is lost on the port. When the first message loss event is a loss delay response event, the port parameter corresponding to the event is a loss delay response parameter that may also be referred to as a port dataset signal fail attribute.loss delay response parameter (portDS.SF.loss-delay-resp-message). The value of the port parameter is the third value, and this indicates that a delay response message is lost on the port.

S610: The network device sets, based on a case that the first message loss event is eliminated, the port parameter corresponding to the message event to a fourth value.

The network device 104 sets, based on the case that the first message loss event is eliminated, the value of the port parameter corresponding to the message loss event to the fourth value, where the fourth value herein may be false, and the fourth value indicates that a clock message of a type corresponding to the port parameter is properly received.

Embodiments provided in this disclosure may be used to recover portDS.SF, but are not limited to this attribute of the clock port, and may also be used to recover another attribute of the clock port. This is not limited in this disclosure.

The foregoing describes method embodiments provided in this disclosure, and the following describes a network device provided in this disclosure.

This disclosure provides an apparatus (for example, a forwarder/network device). The apparatus has a function of implementing behavior of the network device in the foregoing methods. The function may be implemented based on hardware, or may be implemented based on hardware executing corresponding software. The hardware or the software includes one or more modules corresponding to the foregoing function. For example, refer to FIG. 7, FIG. 8, and FIG. 9 below.

Figure 7:
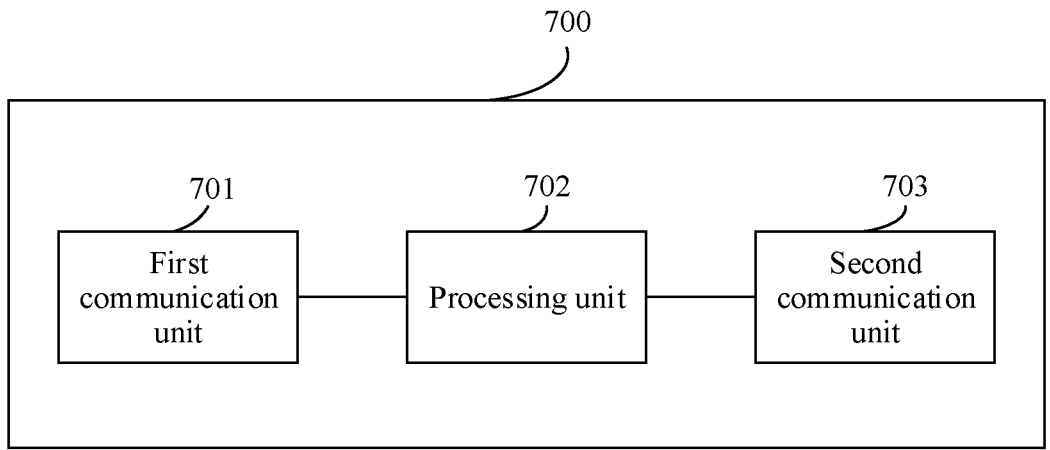
FIG. 7 is a schematic diagram of a structure of an apparatus for implementing clock port status recovery according to an embodiment of this disclosure.

FIG. 7 is a schematic diagram of a structure of an apparatus according to an embodiment of this disclosure. The apparatus 700 may perform the methods performed by the network device (the network device 104) shown in FIG. 4, FIG. 5A, FIG. 5B, FIG. 6A, and FIG. 6B. The apparatus 700 includes a first communication unit 701, a processing unit 702, and a second communication unit 703. The first communication unit 701 may be configured to perform related methods such as receiving a clock message and sending a clock message by the network device in the foregoing method embodiments. The second communication unit 703 may be configured to perform related methods such as receiving a configuration instruction by the network device in the foregoing method embodiments. The first communication unit 701 and the second communication unit 703 may also be implemented by one communication unit. The processing unit 702 may be configured to perform related methods such as generating a message loss event, setting a port attribute value of a clock port to a first value or a second value, determining that a message loss event is eliminated, and modifying a value of a port parameter in the foregoing method embodiments.

It should be noted that, when the network device provided in the embodiment of FIG. 7 performs the foregoing clock port status recovery processing, division into the foregoing functional units is merely used as an example for description. During actual disclosure, the foregoing functions may be allocated to different functional units for implementation as required. In other words, an internal structure of the network device is divided into different functional units, to implement all or some of the functions described above. Alternatively, a unified functional unit is used to complete the functions of the foregoing plurality of units. It should be understood that, the network devices provided in the foregoing embodiment and the foregoing embodiments of the clock port status recovery method belong to a same concept. The steps performed by units of the network devices are merely used as examples for description, and this does not mean that the units of the network devices do not perform other steps or optional methods in the foregoing embodiments. For a specific implementation process, refer to the method embodiments. Details are not described herein again.

Figure 8:
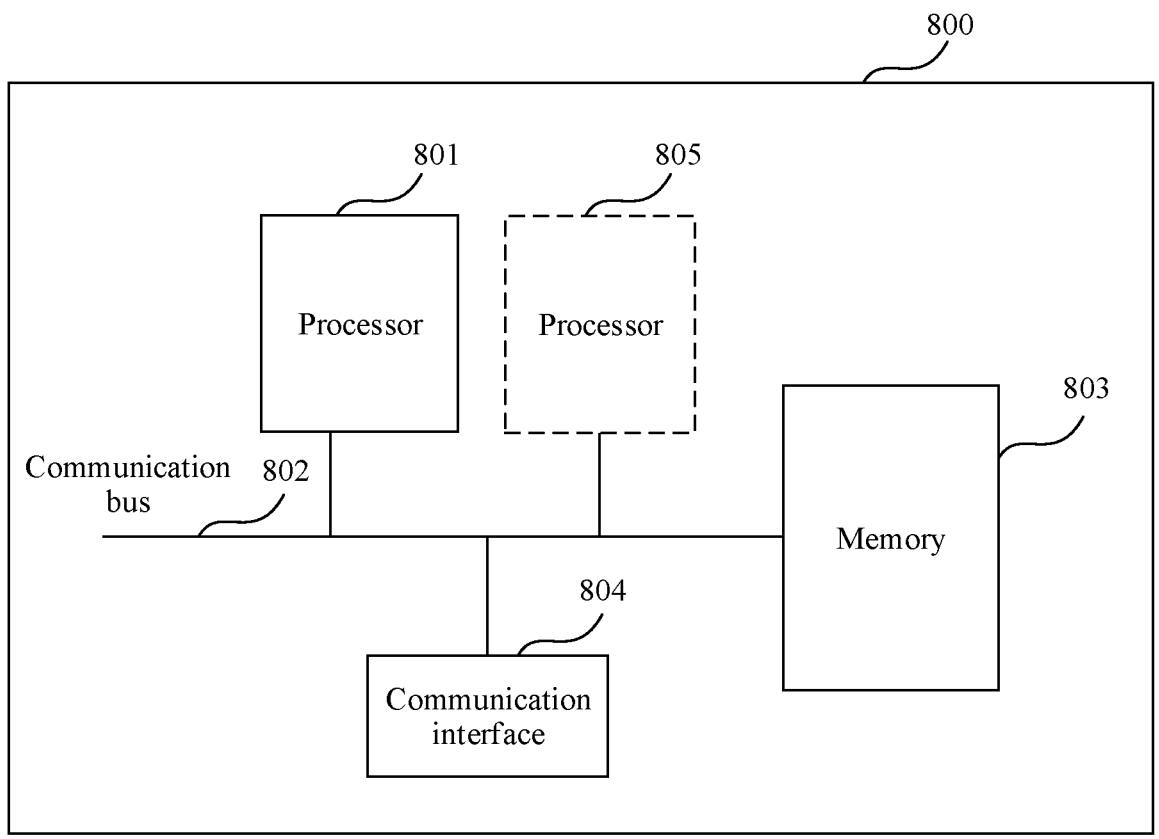
FIG. 8 is a schematic diagram of a structure of an apparatus for implementing clock port status recovery according to an embodiment of this disclosure.

FIG. 8 is a schematic diagram of a structure of a network device 800 according to an embodiment of this disclosure. The apparatus 800 may perform the methods performed by the network device (the network device 104) shown in FIG. 4, FIG. 5A, FIG. 5B, FIG. 6A, and FIG. 6B. Refer to the schematic diagram of the structure of the device shown in FIG. 8. The apparatus 800 includes at least one processor 801, a communication bus 802, and at least one communication interface 804. Optionally, the apparatus 800 may further include a memory 803.

The processor 801 may be a general purpose central processing unit (CPU), an application-specific integrated circuit (ASIC), or one or more integrated circuits configured to control program execution of the solutions in this disclosure. The processor 801 may be configured to detect whether a clock message is lost or received over the communication interface 804, and perform processing based on a detection result, to implement the clock port status recovery method provided in embodiments of this disclosure.

The communication bus 802 is configured to transmit information between the processor 801, the communication interface 804, and the memory 803.

The memory 803 may be a volatile memory or a nonvolatile memory, or may include the volatile memory and the nonvolatile memory. The non-volatile memory may be a read-only memory (ROM), a programmable ROM (PROM), an erasable PROM (EPROM), an electrically EPROM (EEPROM), or a flash memory. The volatile memory may be a random-access memory (RAM), used as an external cache. By way of example but not limitative description, many forms of RAMs may be used, for example, a static RAM (SRAM), a dynamic RAM (DRAM), a synchronous DRAM (SDRAM), a double data rate (DDR) SDRAM, an enhanced SDRAM (ESDRAM), a synchlink DRAM (SLDRAM), and a direct rambus (DR) RAM.

It should be noted that the memory described in this specification aims to include but is not limited to these memories and any memory of another proper type.

The memory 803 may exist independently, and is connected to the processor 801 by using the communication bus 802. The memory 803 may alternatively be integrated with the processor 801.

Optionally, the memory 803 is configured to store program code or instructions for executing the solutions in this disclosure, and the processor 801 controls the execution. The processor 801 is configured to execute the program code stored in the memory 803. The program code may include one or more software modules. Optionally, the processor 801 may alternatively store program code or instructions for executing the solutions in this disclosure.

The communication interface 804 is any apparatus such as a transceiver, and is configured to communicate with another device or a communication network. The communication network may be the Ethernet, a radio access network (RAN), a wireless local area network (WLAN), a wide area network, or the like. In this embodiment of this disclosure, the communication interface 804 may be configured to receive a clock message sent by a second network device in a network, or may send a clock message to the second network device. The communication interface 804 may be an Ethernet interface interface, a Fast Ethernet (FE) interface, a gigabit Ethernet (GE) interface, or the like. The communication interface 804 may be further configured to receive a configuration instruction, so that the processor 801 may modify a value of a port attribute or a port parameter according to an indication of the configuration instruction. The network device may further include another communication interface, and the other communication interface is configured to receive the configuration instruction.

During specific implementation, in an embodiment, the device 800 may include a plurality of processors, for example, the processor 801 and a processor 805 in FIG. 8. Each of the processors may be a single-core processor (single-CPU) or a multi-core processor (multi-CPU). The processor herein may be one or more devices, circuits, and/or processing cores configured to process data (for example, computer program instructions).

In another possible design, this disclosure provides a network device. The network device includes a main control board and an interface board, and may further include a switching board. The network device is configured to perform the method in any possible implementation of the foregoing method, for example, as shown in FIG. 9.

Figure 9:
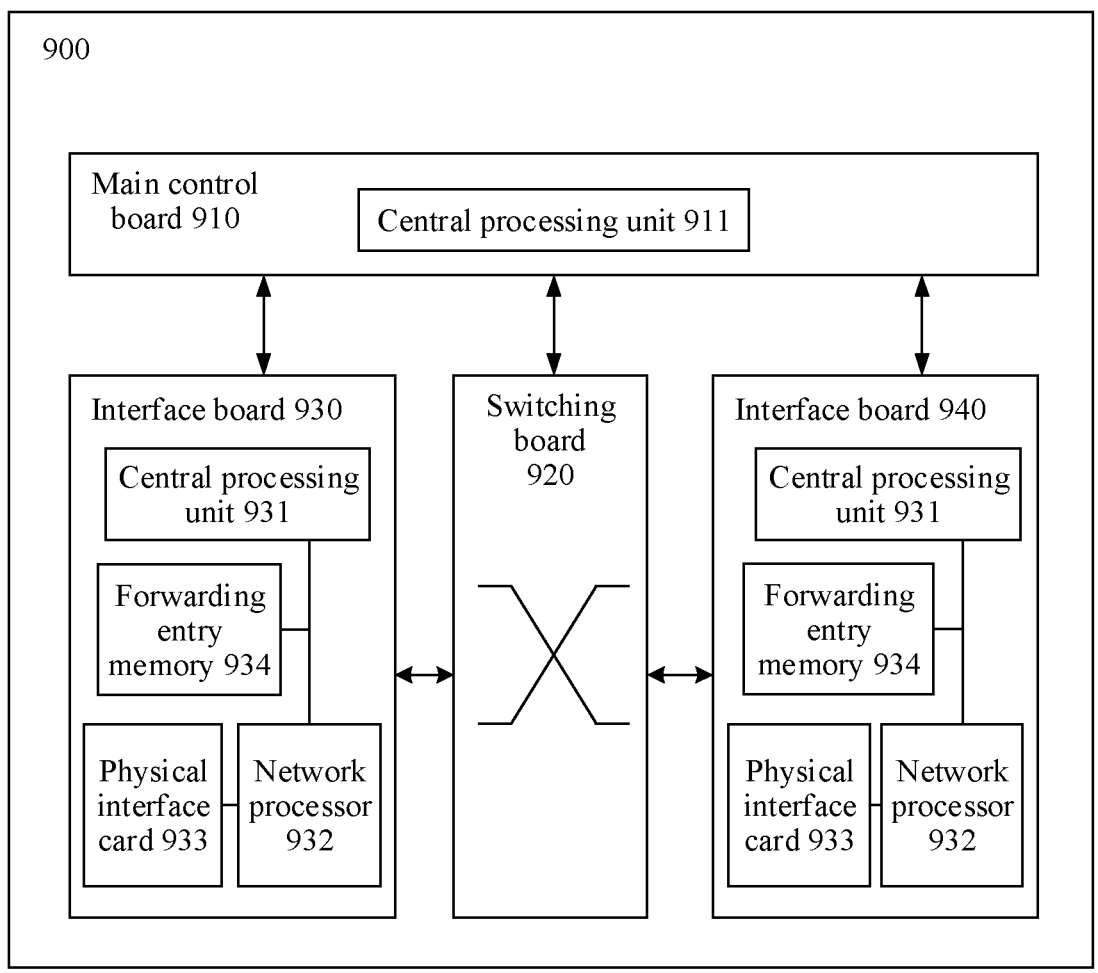
FIG. 9 is a schematic diagram of a structure of an apparatus for implementing clock port status recovery according to an embodiment of this disclosure.

FIG. 9 is a schematic diagram of a structure of an apparatus 900 according to an embodiment of this disclosure. The apparatus 900 may perform the methods performed by the network device (the network device 104) shown in FIG. 4, FIG. 5A, FIG. 5B, FIG. 6A, and FIG. 6B. Refer to the schematic diagram of the structure of the apparatus shown in FIG. 9. The apparatus 900 includes a main control board and one or more interface boards, and the main control board and the interface board are communicatively connected. The main control board is also referred to as a main processing unit (MPU) or a route processor card. The main control board is responsible for controlling and managing each component in the apparatus 900, including route computation, device management, and function maintenance. The interface board is also referred to as a line processing unit (LPU) or a line card, and is configured to forward data. In some embodiments, the apparatus 900 may also include a switching board, the switching board is communicatively connected to the main control board and the interface board, the switching board is configured to forward data between the interface boards, and the switching board may also be referred to as a switch fabric unit (SFU). The interface board includes a CPU, a memory, a forwarding chip, and a physical interface card (PIC). The CPU is communicatively connected to the memory, a network processor, and the physical interface card. The memory is configured to store a forwarding information table. The forwarding chip is configured to forward a received packet based on the forwarding information table stored in the memory. If a destination address of the packet is an address of the apparatus 900, the packet is sent to the CPU such as a CPU 931 for processing. If a destination address of the packet is not an address of the apparatus 900, a next hop and an outbound interface that correspond to the destination address are found from the forwarding information table based on the destination address, and the packet is forwarded to the outbound interface corresponding to the destination address. The forwarding chip may be a network processor (NP). The PIC, also referred to as a subcard, may be installed on the interface board. The PIC is responsible for converting an optical or electrical signal to a data packet, checking validity of the data packet, and forwarding the data packet to the forwarding chip for processing. In some embodiments, the CPU may also perform a function of the forwarding chip, for example, implement software forwarding based on a general-purpose CPU, so that the interface board does not need the forwarding chip. A communication connection between the main control board, the interface board, and the switching board may be implemented by using a bus. In some embodiments, the forwarding chip may be implemented by using an ASIC or a field-programmable gate array (FPGA).

Logically, the apparatus 900 includes a control plane and a forwarding plane. The control plane includes the main control board and the CPU, and the forwarding plane includes components for performing forwarding, such as the memory, the PIC, and the NP. The control plane performs functions such as a function of a router, generating a forwarding information table, processing signaling and protocol packets, and configuring and maintaining a status of a device. The control plane delivers the generated forwarding information table to the forwarding plane. On the forwarding plane, the NP searches the forwarding information table delivered by the control plane to forward a packet received by the PIC of the apparatus 900. The forwarding information table delivered by the control plane may be stored in the memory. In some embodiments, the control plane and the forwarding plane may be totally separated, and are not on a same device.

It should be noted that there may be one or more main control boards, and the plurality of main control boards may include a primary main control board and a secondary main control board. There may be one or more interface boards, and a network device having a stronger data processing capability provides more interface boards. There may also be one or more physical interface cards on the interface board. There may be no switching board or one or more switching boards. The plurality of switching boards may implement load balancing and redundancy backup together. In a centralized forwarding architecture, the network device may not need the switching board, and the interface board provides a function of processing service data in an entire system. In a distributed forwarding architecture, the network device may have at least one switching board, and data exchange between a plurality of interface boards is implemented by using the switching board, to provide a large-capacity data exchange and processing capability. Therefore, a data access and processing capability of the network device in the distributed architecture is better than that of the device in the centralized architecture. Optionally, the network device may alternatively be in a form in which there is only one card. To be specific, there is no switching board, and functions of the interface board and the main control board are integrated on the card. In this case, the CPU on the interface board and the CPU on the main control board may be combined to form one CPU on the card, to perform functions obtained by combining the two CPUs. This form of device (for example, a network device such as a low-end switch or a router) has a weak data exchange and processing capability. A specific architecture that is to be used depends on a specific networking deployment scenario. This is not limited herein.

In a possible design, this disclosure provides a network device. The network device includes a controller and a first forwarding sub-device. The first forwarding sub-device includes an interface board, and may further include a switching board. The first forwarding sub-device is configured to perform a function of the interface board in FIG. 9, and may further perform a function of the switching board in FIG. 9. The controller includes a receiver, a processor, a transmitter, a RAM, a ROM, and a bus. The processor is separately coupled to the receiver, the transmitter, the RAM, and the ROM through the bus. When the controller needs to run, the controller is started by using a basic input/output system built into the ROM or a bootloader system in an embedded system, to boot the controller to enter a normal running state. After the controller enters the normal running state, an application program and an operating system run in the RAM, to enable the processor to execute a function of the main control board.

Method or algorithm steps described in combination with the content disclosed in this disclosure may be implemented by hardware, or may be implemented by a processor by executing software instructions. The software instructions may include a corresponding software module. The software module may be stored in a RAM memory, a flash memory, a ROM memory, an EPROM memory, an EEPROM memory, a register, a hard disk, a removable hard disk, a compact disc (CD) ROM (CD-ROM), or a storage medium in any other form well-known in the art. For example, a storage medium is coupled to a processor, so that the processor can read information from the storage medium or write information into the storage medium. Certainly, the storage medium may further be a component of the processor. The processor and the storage medium may be located in an ASIC. In addition, the ASIC may be located in user equipment. Certainly, the processor and the storage medium may exist in the user equipment as discrete components.

This disclosure provides a computer storage medium configured to store a program, code, or instructions used by the network device. When executing the program, the code, or the instructions, a processor or a hardware device may complete the functions or the steps of the network device.

An embodiment of this disclosure further provides a chip system, including a processor, where the processor is coupled to a memory. The memory is configured to store a program or instructions. When the program or the instructions are executed by the processor, the chip system is enabled to implement the method in any one of the foregoing method embodiments.

Optionally, there may be one or more processors in the chip system. The processor may be implemented by hardware, or may be implemented by software. When the processor is implemented by the hardware, the processor may be a logic circuit, an integrated circuit, or the like. When the processor is implemented by the software, the processor may be a general-purpose processor, and is implemented by reading software code stored in the memory.

Optionally, there may also be one or more memories in the chip system. The memory may be integrated with the processor, or may be disposed separately from the processor. This is not limited in this disclosure. For example, the memory may be a non-transitory processor such as a read-only memory ROM. The memory and the processor may be integrated into a same chip, or may be separately disposed on different chips. A type of the memory and a manner of disposing the memory and the processor are not limited in this disclosure.

For example, the chip system may be an FPGA, an ASIC, a system on chip (SoC), a CPU, an NP, a digital signal processing circuit (or digital signal processor (DSP)), a micro controller unit (MCU), a programmable controller (or programmable logic device (PLD)), or another integrated chip.

It should be understood that steps in the foregoing method embodiments may be implemented by using a hardware integrated logical circuit in the processor or instructions in a form of software. The steps of the methods disclosed with reference to embodiments of this disclosure may be directly performed by a hardware processor, or may be performed by using a combination of hardware in the processor and a software module.

This disclosure provides a network system. The network system includes the foregoing network device and a second network device. The second network device may be any network device that supports a clock synchronization function. The second network device is connected to a first network device by using a communication interface. The second network device includes the communication interface, and the communication interface is used as a master clock port to communicate with the first network device.

A person skilled in the art should be aware that in the foregoing one or more examples, functions described in this disclosure may be implemented by hardware or a combination of hardware and software. When the functions are implemented by the combination of hardware and software, the software may be stored in a computer-readable medium or transmitted as one or more instructions or code on the computer-readable medium. The computer-readable medium includes a computer storage medium and a communication medium. The communication medium includes any medium that facilitates transmission of a computer program from one place to another. The storage medium may be any available medium that can be accessed by a general-purpose or dedicated computer.

It should be understood that, the processor mentioned in embodiments of the present disclosure may be a CPU, or may be another general purpose processor, a digital signal processor (DSP), an ASIC, an FPGA, another PLD, a discrete gate, a transistor logic device, a discrete hardware component, or the like. The general-purpose processor may be a microprocessor or another type of processor.

It should be further understood that the memory mentioned in embodiments of the present disclosure may be a volatile memory or a nonvolatile memory, or may include the volatile memory and the nonvolatile memory. The nonvolatile memory may be a ROM, a PROM, an erasable EPROM, an EEPROM, or a flash memory. The volatile memory may be a random access memory RAM, and may serve as an external cache. By way of example but not limitation description, RAMs of many forms are available, such as an SRAM, a DRAM, an SDRAM, a DDR SDRAM, an ESDRAM, an SLDRAM, and a DR RAM.

It should be noted that the memory described in this specification aims to include but is not limited to these memories and any memory of another proper type.

Sequence numbers of the foregoing processes do not mean execution sequences in various embodiments of this disclosure. Some or all of the steps may be performed in parallel or in sequence. The execution sequences of the processes should be determined based on functions and internal logic of the processes, and should not be construed as any limitation on the implementation processes of embodiments of this disclosure.

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this disclosure, it should be understood that the disclosed system, apparatus, and method may be implemented in another manner. For example, the foregoing apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this disclosure may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions in this disclosure essentially, or the part contributing to the other approaches, or some of the technical solutions may be implemented in the form of a software product. The computer software product is stored in a storage medium and includes several instructions for instructing a computer device (which may be a personal computer, a server, a network device, a terminal device, or the like) to perform all or some of the steps of the methods in embodiments of this disclosure. The foregoing storage medium includes any medium that can store program code, such as a Universal Serial Bus (USB) flash drive, a removable hard disk, a ROM, a RAM, a magnetic disk, or an optical disc.

Related parts of the method embodiments of the present disclosure may be mutually referenced. The apparatus provided in each apparatus embodiment is configured to perform the method provided in the corresponding method embodiment. Therefore, each apparatus embodiment may be understood with reference to a related part in the related method embodiment.

Diagrams of structures of the apparatuses in the apparatus embodiments of the present disclosure merely show simplified designs of the corresponding apparatuses. During actual disclosure, the apparatus may include any quantity of transmitters, receivers, processors, memories, and the like, to implement the function or operation performed by the apparatus in each apparatus embodiment of the present disclosure. However, all apparatuses that can implement this disclosure shall fall within the protection scope of this disclosure.

Names of messages/frames/indication information, modules or units, and the like provided in embodiments of the present disclosure are only examples, and other names may be used provided that functions of the messages/frames/indication information, the modules or units, and the like are the same.

The terms used in embodiments of the present disclosure are merely for the purpose of illustrating specific embodiments, and are not intended to limit the present disclosure. The terms "a" and "the" of singular forms used in embodiments and the appended claims of the present disclosure are also intended to include plural forms, unless otherwise specified in the context clearly. It should also be understood that, the term "and/or" used in this specification indicates and includes any or all possible combinations of one or more associated listed items.

In the foregoing specific implementations, the objective, technical solutions, and benefits of the present disclosure are further described in detail. It should be understood that different embodiments can be combined. The foregoing descriptions are merely specific implementations of the present disclosure, but are not intended to limit the protection scope of the present disclosure. Any combination, modification, equivalent replacement, or improvement made without departing from the spirit and principle of the present disclosure should fall within the protection scope of the present disclosure.

What is claimed is:

1. A clock port attribute recovery method implemented by a first network device, wherein the clock port attribute recovery method comprises:
    setting a port dataset signal fail attribute of a clock port to a first value based on a first event that the clock port does not receive N first clock messages of a first type within a timeout interval, wherein the clock port is coupled to a master port of a second network device, wherein the clock port is a slave port or a passive port, wherein the N first clock messages are synchronization messages, follow-up messages, or delay response messages, wherein N is a positive integer greater than zero, and wherein the first value indicates that a first message is lost on the clock port; and
    setting, after setting the port dataset signal fail attribute to the first value, the port dataset signal fail attribute to a second value when determining that the first event is eliminated,
    wherein the second value indicates that no message is lost on the clock port.

2. The clock port attribute recovery method of claim 1, further comprising receiving a configuration instruction instructing the first network device to set the port dataset signal fail attribute to the second value.

3. The clock port attribute recovery method according to claim 1, further comprising:
    receiving M synchronization messages within a first time when the N first clock messages are the synchronization messages; and
    receiving M follow-up messages within the first time when the N first clock messages are the follow-up messages,
    wherein M is a positive integer greater than zero.

4. The clock port attribute recovery method of claim 1, further comprising receiving a second message indicating that a delay response message loss state of the clock port is recovered.

5. The clock port attribute recovery method of claim 1, further comprising:
generating the first event when detecting that the clock port does not receive the N first clock messages within the timeout interval.

6. The clock port attribute recovery method of claim 1, further comprising:
receiving M synchronization messages and M follow-up messages within a first time, wherein M is a positive integer greater than zero; and
determining that the first event is eliminated.

7. The clock port attribute recovery method of claim 1, further comprising:
setting a port parameter of the clock port corresponding to the first event to a third value when the first event is eliminated, wherein the third value indicates that a second clock message corresponding to the port parameter is not lost,
wherein the port dataset signal fail attribute is set to the second value in response to the port parameter being the third value.

8. The clock port attribute recovery method of claim 6, further comprising:
setting a port parameter of the clock port corresponding to the first type to a third value indicating that a second clock message corresponding to the port parameter is not lost,
wherein the port dataset signal fail attribute is set to the second value in response to the port parameter being the third value.

9. The clock port attribute recovery method of claim 1, further comprising generating, in response to a detection that the clock port does not receive the N first clock messages within the timeout interval, the first event comprising an identifier of the first type.

10. The clock port attribute recovery method of claim 1, wherein after setting the port dataset signal fail attribute to the first value, the clock port attribute recovery method further comprises setting a clock reference source (Erbest) dataset of the clock port to null in response to the port dataset signal fail attribute being the first value.

11. The clock port attribute recovery method of claim 1, further comprising:
identifying that the port dataset signal fail attribute is the first value; and
generating, in response to the port data signal attribute being the first value, a status determining event instructing the first network device to determine a status of the clock port.

12. The clock port attribute recovery method of claim 1, wherein after setting the port dataset signal fail attribute to the second value, the clock port attribute recovery method further comprises setting a clock reference source (Erbest) dataset of the clock port to non-null.

13. The clock port attribute recovery method of claim 1, wherein the port dataset signal fail attribute is the second value before setting the port dataset signal fail attribute to the first value.

14. The clock port attribute recovery method of claim 1, wherein the N first cock messages comprise a Precision Time Protocol (PTP) clock message.

15. The method according to claim 1, wherein the first value is True and the second value is False.

16. A first network device comprising:
a first interface configured to communicate with a master port of a second network device, wherein a clock port status of the first interface is a slave port or a passive port; and
a processor coupled to the first interface and configured to:
set a port dataset signal fail attribute of the first interface to a first value based on a first event that the first interface does not receive N first clock messages of a first type within a timeout interval, wherein the N first clock messages are synchronization messages, follow-up messages, or delay response messages, wherein N is a positive integer greater than zero; and
set, after setting the port dataset signal fail attribute to the first value, the port dataset signal fail attribute to a second value when determining that the first event is eliminate.

17. The first network device of claim 16, further comprising a second interface coupled to the processor and configured to receive a configuration instruction instructing the processor to set the port dataset signal fail attribute to the second value, wherein the processor is further configured to determine, in response to receiving the configuration instruction, that the first event is eliminated.

18. The first network device of claim 16, wherein:
when the first clock messages are the synchronization messages:
the first interface is further configured to receive M synchronization messages within a first time; and
the processor is further configured to determine, in response to receiving the M synchronization messages within the first time, that the first event is eliminated; and
when the N first clock messages are the follow-up messages:
the first interface is further configured to receive M follow-up messages within the first time; and
the processor is further configured to determine, in response to receiving the M follow-up messages within the first time, that the first event is eliminated,
wherein M is a positive integer greater than zero.

19. The first network device of claim 16, further comprising a second interface coupled to the processor and configured to receive a second message indicating that a delay response message loss state of the first interface is recovered, wherein the processor is further configured to determine, in response to receiving the second message, that the first event is eliminated.

20. The first network device of claim 16, wherein the processor is further configured to:
generate the first event in response to a detection that the N first clock messages within the timeout interval.

21. The first network device of claim 16, wherein the first interface is further configured to receive M synchronization messages and M follow-up messages within a first time, wherein M is a positive integer greater than zero, and wherein the processor is further configured to determine, in response to receiving the M synchronization messages and the M follow-up messages within the first time, that the first event is eliminated.

22. The first network device of claim 16, wherein the processor is further configured to:
set a port parameter of the first interface corresponding to the first event to a third value indicating that a second clock message corresponding to the port parameter is not lost, wherein the port dataset signal fail attribute is set to the second value in response to the port parameter being the third value.

23. The first network device of claim 21, wherein the processor is further configured to:
set a port parameter of the first interface corresponding to the first type to a third value indicating that a second clock message corresponding to the port parameter is not lost,
wherein the port dataset signal fail attribute is set to the second value in response to the port parameter being the third value.

24. The first network device of claim 16, wherein the processor is further configured to set a clock reference source (Erbest) dataset of the first interface to null in response to the port dataset signal fail attribute being the first value.

25. The first network device of claim 16, wherein the processor is further configured to:
identify that the port dataset signal fail attribute is the first value; and
generate, in response to the port dataset signal fail attribute being the first value, a status determining event instructing the processor to determine a status of the first interface.

26. The first network device according to claim 16, wherein the first value is True and the second value is False.

27. A non-transitory computer-readable medium comprising computer-executable instructions that are stored on a non-transitory computer-readable medium and that, when executed by a processor, cause a first network device to:
set a port dataset signal fail attribute of a clock port to a first value based on a first event that the clock port does not receive N first clock messages of a first type within a timeout interval, wherein the clock port is coupled to a master port of a second network device, wherein the clock port is a slave port or a passive port, wherein the N first clock messages are synchronization messages, follow-up messages, or delay response messages, wherein N is a positive integer greater than zero, and wherein the first value indicates that a first message is lost on the clock port; and
set, after setting the port dataset signal fail attribute to the first value, the port dataset signal fail attribute to a second value when determining that the first event is eliminated,
wherein the second value indicates that no message is lost on the clock port.

28. The non-transitory computer-readable medium according to claim 27, wherein the first value is True and the second value is False.

* * * * *